(12) United States Patent
Cui et al.

(10) Patent No.: US 11,282,325 B2
(45) Date of Patent: Mar. 22, 2022

(54) SYSTEM AND METHOD FOR INFORMATION PROTECTION

(71) Applicant: ADVANCED NEW TECHNOLOGIES CO., LTD., Grand Cayman (KY)

(72) Inventors: Jiahui Cui, Hangzhou (CN); Baoli Ma, Hangzhou (CN); Zheng Liu, Hangzhou (CN); Wenbin Zhang, Hangzhou (CN); Huanyu Ma, Hangzhou (CN)

(73) Assignee: ADVANCED NEW TECHNOLOGIES CO., LTD., George Town (KY)

(*) Notice: Subject to any disclaimer, the term of this patent is extended or adjusted under 35 U.S.C. 154(b) by 0 days.

(21) Appl. No.: 17/110,251

(22) Filed: Dec. 2, 2020

(65) Prior Publication Data

US 2021/0090375 A1   Mar. 25, 2021

Related U.S. Application Data

(63) Continuation of application No. 16/862,993, filed on Apr. 30, 2020, now Pat. No. 10,885,735, which is a
(Continued)

(51) Int. Cl.
*G06Q 40/00* (2012.01)
*G07F 7/10* (2006.01)
(Continued)

(52) U.S. Cl.
CPC ............... *G07F 7/10* (2013.01); *G06Q 20/10* (2013.01); *G06Q 20/341* (2013.01);
(Continued)

(58) Field of Classification Search
CPC .......... G06Q 20/341; G06Q 20/40145; G06Q 20/3823; G06Q 20/10; H04L 2209/046
(Continued)

(56) References Cited

U.S. PATENT DOCUMENTS

| 4,926,480 A | 5/1990 | Chaum |
| 7,509,498 B2 | 3/2009 | Brickell |

(Continued)

FOREIGN PATENT DOCUMENTS

| CN | 106549749 A | 3/2017 |
| CN | 106911470 A | 6/2017 |

(Continued)

OTHER PUBLICATIONS

Non-Final Office Action for U.S. Appl. No. 16/531,609 dated Jun. 29, 2021.
(Continued)

*Primary Examiner* — Jamara A Franklin

(57) ABSTRACT

A computer-implemented method comprises: committing a transaction amount t of a transaction with a commitment scheme to obtain a transaction commitment value T, the commitment scheme comprising at least a transaction blinding factor r_t; encrypting a combination of the transaction blinding factor r_t and the transaction amount t with a public key PK_B of a recipient of the transaction; and transmitting the transaction commitment value T and the encrypted combination to a recipient node associated with the recipient for the recipient node to verify the transaction.

20 Claims, 7 Drawing Sheets

Related U.S. Application Data continuation of application No. 16/709,794, filed on Dec. 10, 2019, now Pat. No. 10,748,370, which is a continuation of application No. 16/342,713, filed as application No. PCT/CN2018/117571 on Nov. 27, 2018, now Pat. No. 10,726,657.

(51) Int. Cl.
  *G06Q 20/10* (2012.01)
  *G06Q 20/34* (2012.01)
  *G06Q 20/38* (2012.01)
  *G06Q 20/40* (2012.01)

(52) U.S. Cl.
  CPC .............. *G06Q 20/3823* (2013.01); *G06Q 20/40145* (2013.01); *H04L 2209/046* (2013.01)

(58) Field of Classification Search
  USPC ........................................................ 235/379
  See application file for complete search history.

(56) References Cited

U.S. PATENT DOCUMENTS

| | | |
|---|---|---|
| 7,716,484 B1 | 5/2010 | Kaliski, Jr. |
| 7,797,537 B2 | 9/2010 | Kurita et al. |
| 8,316,237 B1 | 11/2012 | Felsher et al. |
| 8,527,777 B2 | 9/2013 | Camenisch et al. |
| 8,762,741 B2 | 6/2014 | Chase et al. |
| 8,819,439 B2 | 8/2014 | Camenisch et al. |
| 8,825,555 B2 | 9/2014 | Gross et al. |
| 9,485,092 B2 | 11/2016 | Smets et al. |
| 10,046,228 B2 | 8/2018 | Tran et al. |
| 10,373,129 B1 | 8/2019 | James et al. |
| 11,080,665 B1 | 8/2021 | Poelstra et al. |
| 2002/0123967 A1 | 9/2002 | Wang |
| 2003/0084291 A1 | 5/2003 | Yamamoto et al. |
| 2003/0187684 A1 | 10/2003 | Bartolini et al. |
| 2007/0116283 A1 | 5/2007 | Tuyls et al. |
| 2007/0294183 A1 | 12/2007 | Camenisch et al. |
| 2008/0235245 A1 | 9/2008 | Huras et al. |
| 2009/0010439 A1 | 1/2009 | Okamoto et al. |
| 2009/0119505 A1 | 5/2009 | Ward et al. |
| 2009/0177591 A1 | 7/2009 | Thorpe et al. |
| 2009/0281949 A1 | 11/2009 | Coppinger |
| 2009/0305673 A1 | 12/2009 | Mardikar |
| 2010/0142704 A1 | 6/2010 | Camenisch et al. |
| 2012/0116978 A1 | 5/2012 | Bruynse et al. |
| 2012/0209790 A1 | 8/2012 | Szyzdlo |
| 2012/0278609 A1 | 11/2012 | Camenisch et al. |
| 2012/0317034 A1 | 12/2012 | Guha et al. |
| 2014/0201069 A1 | 7/2014 | Arentz |
| 2014/0365776 A1 | 12/2014 | Smets et al. |
| 2015/0033301 A1 | 1/2015 | Pianese et al. |
| 2015/0206124 A1 | 7/2015 | Aubin et al. |
| 2015/0371224 A1 | 12/2015 | Lingappa |
| 2016/0292672 A1 | 10/2016 | Fay et al. |
| 2016/0300234 A1 | 10/2016 | Moss-pultz et al. |
| 2016/0306982 A1 | 10/2016 | Seger, II et al. |
| 2016/0342976 A1 | 11/2016 | Davis |
| 2016/0342978 A1 | 11/2016 | Davis et al. |
| 2016/0358165 A1 | 12/2016 | Maxwell |
| 2017/0004497 A1 | 1/2017 | Mestre et al. |
| 2017/0033932 A1 | 2/2017 | Truu et al. |
| 2017/0085555 A1 | 3/2017 | Bisikalo et al. |
| 2017/0154331 A1 | 6/2017 | Voorhees |
| 2017/0177898 A1 | 6/2017 | Dillenberger |
| 2017/0228728 A1 | 8/2017 | Sullivan |
| 2017/0236121 A1 | 8/2017 | Lyons et al. |
| 2017/0243193 A1 | 8/2017 | Manian et al. |
| 2017/0250972 A1 | 8/2017 | Ronda et al. |
| 2017/0310653 A1 | 10/2017 | Zhang |
| 2017/0316497 A1 | 11/2017 | Song et al. |
| 2017/0353309 A1 | 12/2017 | Gray |
| 2017/0372392 A1 | 12/2017 | Metnick et al. |
| 2018/0006823 A1 | 1/2018 | Carbajal et al. |
| 2018/0026784 A1 | 1/2018 | Ward et al. |
| 2018/0032383 A1 | 2/2018 | Surcouf et al. |
| 2018/0034634 A1 | 2/2018 | Benarroch Guenun et al. |
| 2018/0089644 A1 | 3/2018 | Chen et al. |
| 2018/0144114 A1 | 5/2018 | Fiske |
| 2018/0167198 A1 | 6/2018 | Muller et al. |
| 2018/0167208 A1 | 6/2018 | Le Saint et al. |
| 2018/0191503 A1 | 7/2018 | Alwar et al. |
| 2018/0234409 A1 | 8/2018 | Nelson et al. |
| 2018/0253702 A1 | 9/2018 | Dowding |
| 2018/0293576 A1 | 10/2018 | Song et al. |
| 2018/0294955 A1 | 10/2018 | Hwan |
| 2018/0309737 A1 | 10/2018 | Jawaharlal et al. |
| 2018/0315309 A1 | 11/2018 | Becker |
| 2018/0323974 A1 | 11/2018 | Gao et al. |
| 2018/0331832 A1 | 11/2018 | Pulsifer |
| 2018/0331835 A1 | 11/2018 | Daniel |
| 2018/0367298 A1 | 12/2018 | Wright et al. |
| 2019/0052458 A1 | 2/2019 | Wright et al. |
| 2019/0066228 A1 | 2/2019 | Wright |
| 2019/0081796 A1 | 3/2019 | Chow et al. |
| 2019/0130399 A1 | 5/2019 | Wright et al. |
| 2019/0164153 A1 | 5/2019 | Agrawal et al. |
| 2019/0171744 A1 | 6/2019 | Ananthapur Bache et al. |
| 2019/0172057 A1 | 6/2019 | Vincent |
| 2019/0180275 A1 | 6/2019 | Safak |
| 2019/0205873 A1 | 7/2019 | Kamalsky et al. |
| 2019/0236879 A1 | 8/2019 | Ivanov et al. |
| 2019/0244195 A1 | 8/2019 | Ma et al. |
| 2019/0268312 A1 | 8/2019 | Ma et al. |
| 2019/0287095 A1 | 9/2019 | Gaddam et al. |
| 2019/0327082 A1 | 10/2019 | Ow et al. |
| 2019/0327216 A1 | 10/2019 | Walters |
| 2019/0386940 A1 | 12/2019 | Hong et al. |
| 2020/0007318 A1 | 1/2020 | Camenisch et al. |
| 2020/0042726 A1 | 2/2020 | Lawrenson et al. |
| 2020/0051361 A1 | 2/2020 | Cui et al. |
| 2020/0053054 A1 | 2/2020 | Ma et al. |
| 2020/0119910 A1 | 4/2020 | Ojha et al. |
| 2020/0145192 A1 | 5/2020 | Elkhiyaoui et al. |
| 2020/0151992 A1 | 5/2020 | Cui et al. |
| 2020/0211011 A1 | 7/2020 | Anderson |
| 2020/0213085 A1 | 7/2020 | Fletcher |
| 2021/0089676 A1 | 3/2021 | Ford et al. |

FOREIGN PATENT DOCUMENTS

| | | |
|---|---|---|
| CN | 107025602 A | 8/2017 |
| CN | 107077670 A | 8/2017 |
| CN | 108512650 A | 9/2017 |
| CN | 107239951 A | 10/2017 |
| CN | 107451175 A | 12/2017 |
| CN | 107679857 A | 2/2018 |
| CN | 108062671 A | 5/2018 |
| CN | 108282459 A | 7/2018 |
| CN | 108288159 A | 7/2018 |
| CN | 108320228 A | 7/2018 |
| CN | 108418689 A | 8/2018 |
| CN | 108683669 A | 10/2018 |
| CN | 108711105 A | 10/2018 |
| CN | 108764874 A | 11/2018 |
| CN | 108876332 A | 11/2018 |
| CN | 109003184 A | 12/2018 |
| EP | 0773647 A2 | 5/1997 |
| EP | 3576033 A1 | 12/2019 |
| JP | 2000-207466 A | 7/2000 |
| JP | 2000-299683 A | 10/2000 |
| JP | 2007-510947 A | 4/2007 |
| JP | 2007-226777 A | 9/2007 |
| JP | 2010-135928 A | 6/2010 |
| JP | 2013-98666 A | 5/2013 |
| JP | 2018-055203 A | 4/2018 |
| JP | 2018-157432 A | 10/2018 |
| JP | 2020-71617 A1 | 5/2020 |
| KR | 10-2016-0024185 A | 3/2016 |
| KR | 10-1802655 B1 | 11/2017 |
| RU | 2536666 C2 | 12/2014 |
| RU | 2636105 C1 | 11/2017 |

(56) References Cited

FOREIGN PATENT DOCUMENTS

| | | |
|---|---|---|
| RU | 2651245 C2 | 4/2018 |
| TW | 2017333303 A | 9/2017 |
| TW | 201810151 A | 3/2018 |
| TW | M561861 U | 6/2018 |
| TW | I636411 B | 9/2018 |
| WO | 01/69843 A2 | 9/2001 |
| WO | 0180479 A1 | 10/2001 |
| WO | 2002/039391 A2 | 5/2002 |
| WO | 2006121322 A1 | 11/2006 |
| WO | 2009151832 A2 | 12/2009 |
| WO | 2013049689 A1 | 4/2013 |
| WO | 2016/200885 A1 | 12/2016 |
| WO | 2017/145016 A1 | 8/2017 |
| WO | 2017145010 A1 | 8/2017 |
| WO | 2017178956 A1 | 10/2017 |
| WO | 2018019364 A1 | 2/2018 |
| WO | 2018126065 A1 | 7/2018 |
| WO | 2018/168152 A1 | 9/2018 |
| WO | 2018185724 A1 | 10/2018 |
| WO | 2018189634 A1 | 10/2018 |
| WO | 2018189667 A1 | 10/2018 |
| WO | 2018193355 A1 | 10/2018 |
| WO | 2018203186 A1 | 11/2018 |
| WO | 2018207064 A1 | 11/2018 |
| WO | 2018229632 A1 | 12/2018 |
| WO | 2019003072 A1 | 1/2019 |

OTHER PUBLICATIONS

Poon et al., "The Bitcoin Lightning Network: Scalable Off-Chain Instant Payments," Jan. 14, 2016.
Supplementary Search for Chinese Application No. 201810887463.2 dated Nov. 21, 2019 (1 page).
Third Office Action for Chinese Application No. 201810887463.2 dated Dec. 20, 2019 with English machine translatoin (7 pages).
Search Report for European Application No. 18865370.3 dated Jan. 21, 2020 (5 pages).
Shen, "Ring Confidential Transactions," Shen Noether-Monero Research Labs, Jan. 1, 2015 (34 pages).
Ma et al., "An Efficient NIZK Scheme for Privacy-Preserving Transactions over Account-Model Blockchain," Sep. 4, 2014 (12 pages).
First Examination Report for Australian Application No. 2018347196 dated Jan. 20, 2020 (3 pages).
Search Report for European Application No. 18865369.5 dated Jan. 24, 2020 (4 pages).
First Examination Report for Australian Application No. 2018347197 dated Jan. 20, 2020 (3 pages).
Search Report for European Application No. 18865371.1 dated Jan. 24, 2020 (4 pages).
Office Action for Canadian Application No. 3037833 dated Apr. 28, 2020.
Office Action for Japanese Application No. 2019-521112 dated Apr. 7, 2020.
Office Action for Canadian Application No. 3040601 dated May 5, 2020.
Search Report for Taiwanese Application No. 108110709 dated Apr. 24, 2020.
Notice of Allowance for Japanese Application No. 2019-520853 dated May 19, 2020.
Pedersen, T. P., "Non-Interactive and Information-Theoretic Secure Verifiable Secret Sharing", Advances in Cryptology—CRYPTO'91, Springer-Verlag, Aug. 1991.
Franca, Homomorphic Mini-blockchain Scheme, 2015) (Year: 2015).
Written Opinion for PCT Application No. PCT/US2019/045090 dated Mar. 11, 2020 (5 pages).
Examination Report No. 1 for Australian Application No. 2018322507 dated Feb. 5, 2020 (6 pages).
Poelstra A. et al,'Confidential assets' In: International Conference on Financial Cryptography and Data Security Feb. 26, 2018 (pp. 43-63). Springer, Berlin, Heidelberg.
Engelmann F. et al, 'Coloured Ring Confidential Transactions' In: Data Privacy Management, Cryptocurrencies and Blockchain Technology Sep. 6, 2018 (pp. 188-196). Springer, Cham.
Seguias Bek 'Monera's Building Blocks' [Retrieved from internet on Jan. 29, 2020] <URL: https://delfr.com/category/monero/> Jun. 18, 2018.
Search Report for European Application No. 18863802.7 dated Jan. 29, 2020 (5 pages).
Examination Report for European Application No. 18863802.7 dated Feb. 12, 2020 (6 pages).
Li Bin et al., "RZKPB: A Privacy-Preserving Blockchain-Based Fair Transaction Method for Sharing Economy," 2018 17th IEEE International Conference on Trust, Security, and Privacy in Computing and Communications, IEEE, Aug. 1, 2018 (6 pages).
Ian Miers et al., "Zerocoin: Anonymous Distributed E-Cash from Bitcoin," Security and Privacy, IEEE, May 19, 2013, 15 pages).
Examination Report No. 1 for Australian Application No. 2018327218 dated Feb. 6, 2020 (8 pages).
Search Report for European Application No. 18863790.4 dated Jan. 24, 2020 (8 pages).
Decision on Grant for Russian Application No. 2019111969 dated Feb. 12, 2020 (29 pages).
Examination Report No. 1 for Australian Application No. 2018347195 dated Feb. 4, 2020 (6 pages).
First Office Action for Canadian Application No. 3040357 dated Feb. 17, 2020 (6 pages).
Examination Report for European Application No. 18865370.3 dated Feb. 12, 2020 (8 pages).
Non-Final Office Action for U.S. Appl. No. 16/708,329 dated Mar. 19, 2020 (16 pages).
Maxwell (Greg Maxwell, "Confidential transactions", 2015, found at https://people.xiph.org/-greg/confidential_values.cxt).
Examination Report for Euroroean Application No. 18865369.5 dated Feb. 12, 2020 (5 pages).
Office Action and Search Report for Russian Application No. 2019111930 dated Feb. 13, 2020 (15 pages).
Jadhav H., Chandre P., Association rule mining methods for applying encryption techniques in transaction dataset, 2016 International Conference on Computer Communication and Informatics (ICCCI), Jan. 7-9, 2016, Coimbatore, India.
Office Action and Search Report for Russian Application No. 2019111926 dated Jan. 15, 2020 (19 pages).
Preinterview first office action for U.S. Appl. No. 16/709,770 dated Feb. 5, 2020.
First action interview—office action for U.S. Appl. No. 16/709,770 dated Mar. 12, 2020.
Office Action for Canadian Application No. 3040791 dated Mar. 2, 2020 (5 pages).
Examination Report for European Application No. 18865371.1 dated Feb. 12, 2020 (5 pages).
Decision on Grant for Russian Application No. 2019111929 dated Jan. 30, 2020 (26 pages).
Decision on Grant for Russian Application No. 2019111923 dated Mar. 23, 2020.
Written Opinion of the International Searching Authority and International Search Report for PCT Application No. PCT/CN2018/117548 dated Aug. 28, 2019 (7 pages).
Written Opinion of the International Searching Authority and International Search Report for PCT Application No. PCT/CN2018/117552 dated Aug. 27, 2019 (7 pages).
Written Opinion of the International Searching Authority and International Search Report for PCT Application No. PCT/CN2018/117558 dated Aug. 28, 2019 (6 pages).
Written Opinion of the International Searching Authority and International Search Report for PCT Application No. PCT/CN2018/117560 dated Aug. 27, 2019 (7 pages).
Written Opinion of the International Searching Authority and International Search Report for PCT Application No. PCT/CN2018/117571 dated Aug. 27, 2019 (6 pages).
First Office Action for Chinese Application No. 201810887463.2 dated May 27, 2019 with English machine translation (10 pages).
Second Office Action for Chinese Application No. 201810887463.2 dated Sep. 29, 2019 with English machine translation (8 pages).

(56) References Cited

OTHER PUBLICATIONS

Written Opinion for Singaporean Application No. 10202006534U dated Jun. 8, 2021.
Written Opinion of the International Searching Authority and International Search Report for PCT Application No. PCT/US2019/045090 dated Oct. 16, 2019 (12 pages).
Gibson, "An investigation into Confidential Transactions," Jul. 12, 2018, retrieved from the internet: https://github.com/AdamISZ/ConfidentialTransactionsDoc/raw/master/essayonCT.pdf (22 pages).
Sun et al., "RingCT 2.0: A Compact Accumulator-Based (Linkable Ring Signature) Protocol for Blockchain Cryptocurrency Manero," International Conference on Computer Analysis of Images and Patterns, Aug. 12, 2017 (20 pages).
Bunz et al., "Bulletproofs: Short Proofs for Confidential Transactions and More," IEEE Symposium on Security and Privacy (SP), May 20, 2018 (20 pages).
First Search for Chinese Application No. 201810887463.2 dated May 14, 2019 (1 page).
Notice of Allowance for U.S. Appl. No. 16/342,713 dated Apr. 2, 2020.
Notice of Allowance for U.S. Appl. No. 16/708,249 dated Apr. 8, 2020.
Notice of Allowance for Korean Application No. 10-2019-7011443 dated Jun. 12, 2010.
Notice of Allowance for Japanese Application No. 2019-520982 dated Jun. 16, 2020.
Yoshihama et al., "Integreity and privacy protection in distributed ledger technology", Oct. 16, 2017, CSS 2017 Computer Security Symposium 2017. [English abstract provided].
Written Opinion for Singaporean Application No. 11201902778U dated May 26, 2020.
Tam Le et al.,"CapChain: A Privacy Preserving Access Control Framework Based on Blockchain for Pervasive Environments". 2018 IEEE International Conference on Smart Computing SMARTCOMP, Jun. 20, 2018, pp. 57-64.
Office Action for Korean Application No. 10-2019-7011444 dated Jun. 2, 2020.
Alfred J. Menezes, Handbook of Applied Cryptography, CRC Press, 1996.
Written Opinion for Singaporean Application No. 11201903425P dated Jun. 2, 2020.
Friss, Digicash implementation. thesis, Jun. 4, 2003.
Written Opinion for Singaporean Application No. 11201903438T dated May 26, 2020.
Office Action for Korean Application No. 10-2019-7011446 dated Jun. 10, 2020.
Final Office Action for U.S. Appl. No. 16/738,055 dated Jul. 2, 2020.
Written Opinion for Singaporean Application No. 11201902773V dated Jun. 2, 2020.
Office Action for Canadian Application No. 3040611 dated Apr. 30, 2020.
Notice of Allowance for U.S. Appl. No. 16/708,329 dated Apr. 8, 2020.
Office Action for Korean Application No. 10-2019-7011447 dated Sep. 1, 2020.
Search Report for Taiwanese Application No. 108125044 dated Aug. 19, 2020.
Office Action for Japanese Application No. 2019-520859 dated Sep. 15, 2020.
Aganuma Ken et al., "Decentralized netting protocol over hyperledger Fabric", Abstract of 2018 Symposium on Cryptography and Information Security (SCIS2018), The Institute of Electornics, Information and Communication Engineers, Jan. 23, 2018, p. 1-6 Refer specifically to "4.1 Channel Structure", "Appendix A:Pedersen commitment", "Appendix B:Malicious, Responding to . . . Nodes".
Office Action for Japanese Application No. 2019-520976 dated Oct. 6, 2020.
Gertner et al., "Pubicly-Verifiable SignCryption," Committing Encryption and Public-Verifiable SignCryption, Cryptology ePrint Archive, Dec. 16, 2003.
Notice of Allowance for U.S. Appl. No. 16/708,297 dated Apr. 23, 2021.
Billislioglu et al., "Robust Tracking Commitment," IEEE Transactions on Automatic Control, vol. 62, Issue: 9 | Journal Article | Publisher, IEEE, 2017.
Han et al., "Improving Privacy and Security in Decentralized Ciphertext-Policy Attribute-Based Encryption," IEEE Transactions on Information Forensics and Security, vol. 10, Issue: 3 | Journal Article | Publisher: IEEE, 2015.
First Examination Report for Indian Application No. 201947015708 dated Jul. 16, 2021.
Seguias, "Monero's Building Blocks Part 8 of 10—Introduction to Pedersen Commitments and Confidential Transactions," Apr. 24, 2018.
Final Office Action for U.S. Appl. No. 16/342,605 dated Aug. 13, 2021.
Non-Final Office Action for U.S. Appl. No. 16/708,297 dated Feb. 5, 2021.
Non-Final Office Action for U.S. Appl. No. 16/342,605 dated Mar. 17, 2021.
Wikipedia entry for Elliptic Curve Diffie-Hellman archived by the Internet Archive on Jul. 17, 2018, https://web.archive.org/web/20180717235903/https://en .wikipedia.org/wiki/Elliptic-curve_Diffie%E2%80%93Hellman, retrieved on Mar. 12, 2021.
Non-Final Office Action for U.S. Appl. No. 16/738,055 dated Feb. 9, 2021.
Notice of Allowance for U.S. Appl. No. 16/531,609 dated Nov. 29, 2021.

300

301: committing a transaction amount t of a transaction with a commitment scheme to obtain a transaction commitment value T, the commitment scheme comprising at least a transaction blinding factor r_t

302: encrypting a combination of the transaction blinding factor r_t and the transaction amount t with a public key PK_B of a recipient of the transaction

303: transmitting the transaction commitment value T and the encrypted combination to a recipient node associated with the recipient for the recipient node to verify the transaction

401: obtaining a combination of a transaction blinding factor r_t and a transaction amount t encrypted with a public key PK_B of a recipient of a transaction, and obtaining a transaction commitment value T, wherein: the transaction amount t is committed with a commitment scheme by a sender node associated with a sender of the transaction to obtain the transaction commitment value T, the commitment scheme comprising at least the transaction blinding factor r_t

402: decrypting the obtained combination with a private key SK_B of a recipient of the transaction to obtain the transaction blinding factor r_t and the transaction amount t

403: verifying the transaction based at least on the transaction commitment value T, the transaction blinding factor r_t, and the transaction amount t

441: committing a transaction amount t of a transaction with a commitment scheme to obtain a transaction commitment value T, the commitment scheme comprising at least a transaction blinding factor r_t

442: sending the transaction amount t, the transaction blinding factor r_t, and the transaction commitment value T to a recipient node associated with a recipient of the transaction for the recipient node to verify the transaction and to encrypt the transaction blinding factor r_t and the transaction amount t with a public key PK_B of the recipient

443: obtaining an encrypted combination of the transaction blinding factor r_t and the transaction amount t from the recipient node

444: transmitting the encrypted combination and the transaction commitment value T to a plurality of nodes in a blockchain for the plurality of nodes to verify the transaction

451: obtaining a transaction amount t of a transaction, a transaction blinding factor r_t, and a transaction commitment value T

452: verifying the transaction based on the obtained transaction amount t, the obtained transaction blinding factor r_t, and the obtained transaction commitment value T

453: in response to successfully verifying the transaction, encrypting the transaction blinding factor r_t and the transaction amount t with a public key PK_B of a recipient of the transaction to obtain an encrypted combination

454: transmitting the encrypted combination to a sender node associated with a sender of the transaction

FIG. 4B

SYSTEM AND METHOD FOR INFORMATION PROTECTION

CROSS REFERENCE TO RELATED APPLICATION

This application is a continuation application of U.S. patent application Ser. No. 16/862,993 filed on Apr. 30, 2020 and entitled "SYSTEM AND METHOD FOR INFORMATION PROTECTION," which is a continuation application of U.S. patent application Ser. No. 16/709,794 filed on Dec. 10, 2019 and entitled "SYSTEM AND METHOD FOR INFORMATION PROTECTION." U.S. patent application Ser. No. 16/709,794 is a continuation application of U.S. patent application Ser. No. 16/342,713 filed on Apr. 17, 2019 and entitled "SYSTEM AND METHOD FOR INFORMATION PROTECTION." U.S. patent application Ser. No. 16/342,713 is a national phase application of International Application No. PCT/CN2018/117571, filed on Nov. 27, 2018. The contents of all of the above-identified applications are incorporated by reference in the entirety.

TECHNICAL FIELD

This disclosure generally relates to methods and devices for information protection.

BACKGROUND

Privacy is important to communications and data transfers among various users. Without protection, the users are exposed to the risk of identity theft, illegal transfer, or other potential losses. The risk becomes even greater when the communications and transfers are implemented online, because of the free access of online information.

SUMMARY

Various embodiments of the present disclosure include systems, methods, and non-transitory computer readable media for information protection.

According to one aspect, a computer-implemented method for information protection comprises: committing a transaction amount t of a transaction with a commitment scheme to obtain a transaction commitment value T, the commitment scheme comprising at least a transaction blinding factor r_t; encrypting a combination of the transaction blinding factor r_t and the transaction amount t with a public key PK_B of a recipient of the transaction; and transmitting the transaction commitment value T and the encrypted combination to a recipient node associated with the recipient for the recipient node to verify the transaction.

In some embodiments, the public key PK_B is an asymmetric encryption key.

In some embodiments, the commitment scheme comprises a Pedersen commitment based at least on the transaction blinding factor r_t and with the transaction amount t being a committed value.

In some embodiments, the combination of the transaction blinding factor r_t and the transaction amount t comprises a concatenation of the transaction blinding factor r_t and the transaction amount t.

In some embodiments, transmitting the transaction commitment value T and the encrypted combination to the recipient node associated with the recipient for the recipient node to verify the transaction comprises transmitting the transaction commitment value T and the encrypted combination to the recipient node associated with the recipient, causing the recipient node to: decrypt the encrypted combination with a private key SK_B of the recipient to obtain the transaction blinding factor r_t and the transaction amount t; and verify the transaction based at least on the transaction commitment value T, the transaction blinding factor r_t, and the transaction amount t.

In some embodiments, causing the recipient node to verify the transaction based at least on the transaction commitment value T, the transaction blinding factor r_t, and the transaction amount t comprises causing the recipient node to: in response to determining that the transaction commitment value T does not match the commitment scheme of the transaction amount t based on the transaction blinding factor r_t, reject the transaction; and in response to determining that the transaction commitment value T matches the commitment scheme of the transaction amount t based on the transaction blinding factor r_t, approve the transaction by signing the transaction with the private key SK_B of the recipient to generate a recipient signature SIGB.

In some embodiments, before transmitting the encrypted combination to the recipient node associated with the recipient, the method further comprises: committing a change y of the transaction with the commitment scheme to obtain a change commitment value Y, the commitment scheme comprising at least a change blinding factor r_y, wherein the change y is one or more assets of a sender of the transaction that are tapped for the transaction less the transaction amount t; and encrypting another combination of the change blinding factor r_y and the change y with a public key PK_A of the sender.

In some embodiments, the method further comprises: in response to receiving the recipient signature SIGB, approving the transaction by signing the transaction with a private key SK_A of the sender to generate a sender signature SIGA; and submitting the transaction comprising the encrypted combination, the encrypted another combination, the transaction commitment value T, the change commitment value Y, the sender signature SIGA, and the recipient signature SIGB to one or more nodes in a blockchain network for the one or more nodes to verify the transaction.

In some embodiments, submitting the transaction comprising the encrypted combination, the encrypted another combination, the transaction commitment value T, the change commitment value Y, the sender signature SIGA, and the recipient signature SIGB to the one or more nodes in the blockchain network for the one or more nodes to verify the transaction comprises: submitting the transaction comprising the encrypted combination, the encrypted another combination, the transaction commitment value T, the change commitment value Y, the sender signature SIGA, and the recipient signature SIGB to the one or more nodes in the blockchain network, causing the one or more nodes to, in response to successfully verifying the transaction, issue the transaction amount t to the recipient, eliminate the one or more assets tapped for the transaction, and issue the change y to the sender.

According to another aspect, a non-transitory computer-readable storage medium stores instructions to be executed by a processor to cause the processor to perform operations comprising: committing a transaction amount t of a transaction with a commitment scheme to obtain a transaction commitment value T, the commitment scheme comprising at least a transaction blinding factor r_t; encrypting a combination of the transaction blinding factor r_t and the transaction amount t with a public key PK_B of a recipient of the transaction; and transmitting the transaction commitment value T and the encrypted combination to a recipient node associated with the recipient for the recipient node to verify the transaction.

According to another aspect, a system for information protection comprises a processor and a non-transitory computer-readable storage medium coupled to the processor, the storage medium storing instructions to be executed by the processor to cause the system to perform operations comprising: committing a transaction amount t of a transaction with a commitment scheme to obtain a transaction commitment value T, the commitment scheme comprising at least a transaction blinding factor r_t; encrypting a combination of the transaction blinding factor r_t and the transaction amount t with a public key PK_B of a recipient of the transaction; and transmitting the transaction commitment value T and the encrypted combination to a recipient node associated with the recipient for the recipient node to verify the transaction.

According to another aspect, a computer-implemented method for information protection comprises: obtaining a combination of a transaction blinding factor r_t and a transaction amount t encrypted with a public key PK_B of a recipient of a transaction, and obtaining a transaction commitment value T, wherein: the transaction amount t is committed with a commitment scheme by a sender node associated with a sender of the transaction to obtain the transaction commitment value T, the commitment scheme comprising at least the transaction blinding factor r_t; decrypting the obtained combination with a private key SK_B of a recipient of the transaction to obtain the transaction blinding factor r_t and the transaction amount t; and verifying the transaction based at least on the transaction commitment value T, the transaction blinding factor r_t, and the transaction amount t.

In some embodiments, the public key PK_B of the recipient and the private key SK_B of the recipient are asymmetric encryption keys.

According to another aspect, a non-transitory computer-readable storage medium stores instructions to be executed by a processor to cause the processor to perform operations comprising: obtaining a combination of a transaction blinding factor r_t and a transaction amount t encrypted with a public key PK_B of a recipient of a transaction, and obtaining a transaction commitment value T, wherein: the transaction amount t is committed with a commitment scheme by a sender node associated with a sender of the transaction to obtain the transaction commitment value T, the commitment scheme comprising at least the transaction blinding factor r_t; decrypting the obtained combination with a private key SK_B of a recipient of the transaction to obtain the transaction blinding factor r_t and the transaction amount t; and verifying the transaction based at least on the transaction commitment value T, the transaction blinding factor r_t, and the transaction amount t.

According to another aspect, a system for information protection comprises a processor and a non-transitory computer-readable storage medium coupled to the processor, the storage medium storing instructions to be executed by the processor to cause the system to perform operations comprising: obtaining a combination of a transaction blinding factor r_t and a transaction amount t encrypted with a public key PK_B of a recipient of a transaction, and obtaining a transaction commitment value T, wherein: the transaction amount t is committed with a commitment scheme by a sender node associated with a sender of the transaction to obtain the transaction commitment value T, the commitment scheme comprising at least the transaction blinding factor r_t; decrypting the obtained combination with a private key SK_B of a recipient of the transaction to obtain the transaction blinding factor r_t and the transaction amount t; and verifying the transaction based at least on the transaction commitment value T, the transaction blinding factor r_t, and the transaction amount t.

According to another aspect, a computer-implemented method for information protection comprises: committing a transaction amount t of a transaction with a commitment scheme to obtain a transaction commitment value T, the commitment scheme comprising at least a transaction blinding factor r_t; sending the transaction amount t, the transaction blinding factor r_t, and the transaction commitment value T to a recipient node associated with a recipient of the transaction for the recipient node to verify the transaction and to encrypt the transaction blinding factor r_t and the transaction amount t with a public key PK_B of the recipient; obtaining an encrypted combination of the transaction blinding factor r_t and the transaction amount t from the recipient node; and transmitting the encrypted combination and the transaction commitment value T to a plurality of nodes in a blockchain for the plurality of nodes to verify the transaction.

According to another aspect, a non-transitory computer-readable storage medium stores instructions to be executed by a processor to cause the processor to perform operations comprising: committing a transaction amount t of a transaction with a commitment scheme to obtain a transaction commitment value T, the commitment scheme comprising at least a transaction blinding factor r_t; sending the transaction amount t, the transaction blinding factor r_t, and the transaction commitment value T to a recipient node associated with a recipient of the transaction for the recipient node to verify the transaction and to encrypt the transaction blinding factor r_t and the transaction amount t with a public key PK_B of the recipient; obtaining an encrypted combination of the transaction blinding factor r_t and the transaction amount t from the recipient node; and transmitting the encrypted combination and the transaction commitment value T to a plurality of nodes in a blockchain for the plurality of nodes to verify the transaction.

According to another aspect, a system for information protection comprises a processor and a non-transitory computer-readable storage medium coupled to the processor, the storage medium storing instructions to be executed by the processor to cause the system to perform operations comprising: committing a transaction amount t of a transaction with a commitment scheme to obtain a transaction commitment value T, the commitment scheme comprising at least a transaction blinding factor r_t; sending the transaction amount t, the transaction blinding factor r_t, and the transaction commitment value T to a recipient node associated with a recipient of the transaction for the recipient node to verify the transaction and to encrypt the transaction blinding factor r_t and the transaction amount t with a public key PK_B of the recipient; obtaining an encrypted combination of the transaction blinding factor r_t and the transaction amount t from the recipient node; and transmitting the encrypted combination and the transaction commitment value T to a plurality of nodes in a blockchain for the plurality of nodes to verify the transaction.

According to another aspect, a computer-implemented method for information protection comprises: obtaining a transaction amount t of a transaction, a transaction blinding factor r_t, and a transaction commitment value T; verifying the transaction based on the obtained transaction amount t, the obtained transaction blinding factor r_t, and the obtained transaction commitment value T; in response to successfully verifying the transaction, encrypting the transaction blinding factor r_t and the transaction amount t with a public key PK_B of a recipient of the transaction to obtain an encrypted combination; and transmitting the encrypted combination to a sender node associated with a sender of the transaction.

According to another aspect, a non-transitory computer-readable storage medium stores instructions to be executed by a processor to cause the processor to perform operations comprising: obtaining a transaction amount t of a transaction, a transaction blinding factor r_t, and a transaction commitment value T; verifying the transaction based on the obtained transaction amount t, the obtained transaction blinding factor r_t, and the obtained transaction commitment value T; in response to successfully verifying the transaction, encrypting the transaction blinding factor r_t and the transaction amount t with a public key PK_B of a recipient of the transaction to obtain an encrypted combination; and transmitting the encrypted combination to a sender node associated with a sender of the transaction.

According to another aspect, a system for information protection comprises a processor and a non-transitory computer-readable storage medium coupled to the processor, the storage medium storing instructions to be executed by the processor to cause the system to perform operations comprising: obtaining a transaction amount t of a transaction, a transaction blinding factor r_t, and a transaction commitment value T; verifying the transaction based on the obtained transaction amount t, the obtained transaction blinding factor r_t, and the obtained transaction commitment value T; in response to successfully verifying the transaction, encrypting the transaction blinding factor r_t and the transaction amount t with a public key PK_B of a recipient of the transaction to obtain an encrypted combination; and transmitting the encrypted combination to a sender node associated with a sender of the transaction.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 3A illustrates a flowchart of an exemplary method for information protection, in accordance with various embodiments.

FIG. 3B illustrates a flowchart of an exemplary method for information protection, in accordance with various embodiments.

FIG. 4A illustrates a flowchart of an exemplary method for information protection, in accordance with various embodiments.

FIG. 4B illustrates a flowchart of an exemplary method for information protection, in accordance with various embodiments.

DETAILED DESCRIPTION

Figure 1:
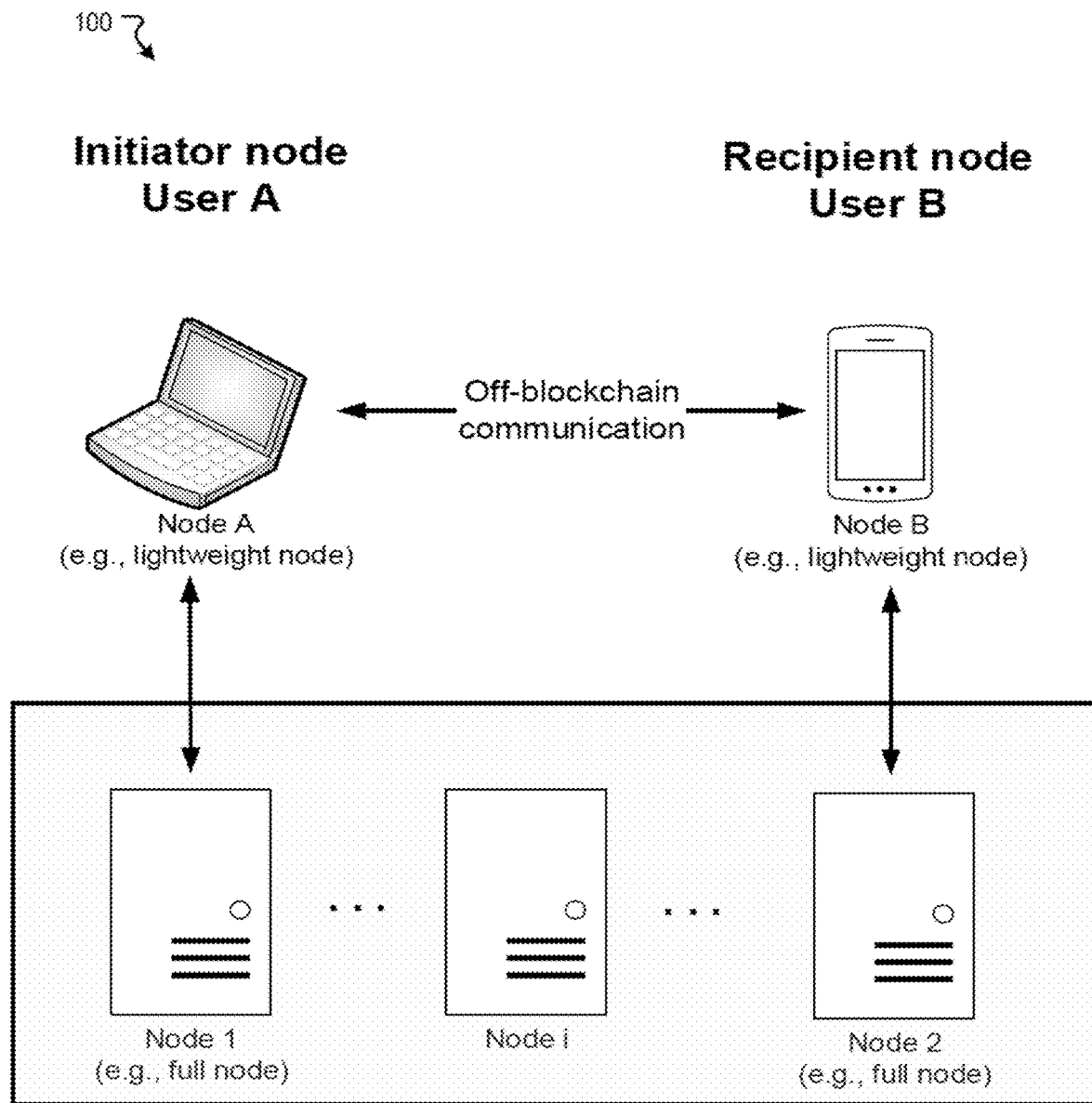
FIG. 1 illustrates an exemplary system for information protection, in accordance with various embodiments.

Blockchain may be considered as a decentralized database, commonly referred to as a distributed ledger because the operation is performed by various nodes (e.g., computing devices) in a network. Any information may be written to the blockchain and saved or read from ft. Anyone may set up a server and join the blockchain network to become a node. Any node may contribute computing power to maintain the blockchain by performing complex computations, such as hash calculation to add a block to a current blockchain, and the added block may contain various types of data or information. The node that contributed the computing power for the added block may be rewarded with a token (e.g., digital currency unit). Since the blockchain has no central node, each node is equal and holds the entire blockchain database.

Nodes are, for example, computing devices or large computer systems that support the blockchain network and keep it running smoothly. There are two types of nodes, full nodes and lightweight nodes. Full nodes keep a complete copy of the blockchain. The full nodes on the blockchain network validate transactions and blocks they receive and relay them to connected peers for providing consensus verification of the transactions. Lightweight nodes, on the other hand, only download a fraction of the blockchain. For example, lightweight nodes are used for digital currency transactions. A lightweight node will communicate to a full node when it wants to transact.

This decentralization property can help prevent the emergence of a management center in a controlled position. For example, the maintenance of the bitcoin blockchain is performed by the network of communication nodes of the bitcoin software in the running area. This disclosure uses one or more blockchains or digital currencies, such as bitcoin and Ethereum, as examples. A person with ordinary skill in the art should appreciate that the technical solutions disclosed in this disclosure can use or apply to other type of blockchains and digital currencies. That is, instead of banks, institutions, or administrators in the traditional sense, multiple intermediaries exist in a form of computer servers executing bitcoin software. These computer servers form a network connected via the Internet, wherein anyone can potentially join the network. Transactions accommodated by the network may be of a form: "user A wants to send Z bitcoins to user B," wherein the transactions are broadcast to the network using readily available software applications. The computer servers function as bitcoin servers that are operable to validate these financial transactions, add a record of them to their copy of the ledger, and then broadcast these ledger additions to other servers of the network.

Maintaining the blockchain is referred to as "mining," and those who do such maintenance are rewarded with newly created bitcoins and transaction fees as aforementioned. For example, nodes may determine if the transactions are valid based on a set of rules the blockchain network has agreed to. Miners may be located on any continent and process payments by verifying each transaction as valid and adding it to the blockchain. Such verification is achieved via consensus provided by a plurality of miners and assumes that there is no systematic collusion. In the end, all data will be consistent, because the computation has to meet certain requirements to be valid and all nodes will be synchronized to ensure that the blockchain is consistent. Thus, data can be consistently stored in a distributed system of blockchain nodes.

Through the mining process, transactions such as asset transfers are verified and added to a growing chain of blocks of a blockchain by network nodes. By traversing the entire blockchain; the verification may include, for example, whether the paying party has access to the transferring asset, whether the asset had been spent before, whether the transferring amount is correct, etc. For example, in a hypothetical transaction (e.g., a transaction of bitcoins under a UTXO (unspent transaction output) model, a transaction of Ethereum coins under an Account/Balance model) signed off by a sender, the proposed transaction may be broadcast to the blockchain network for mining. A miner needs to check if the transaction is eligible to be executed according to the blockchain history. If the sender's wallet balance has sufficient funds according to the existing blockchain history, the transaction is considered valid and can be added to the block. Once verified, the asset transfers may be included in the next block to be added to the blockchain.

A block is much like a database record. Each time writing data creates a block. These blocks are linked and protected using cryptography to become interconnected networks. Each block is connected to the previous block, which is also the origin of the name "blockchain." Each block usually contains the cryptographic hash of the previous block, the generation time, and the actual data. For instance, each block contains two parts: a block header to record the feature value of the current block, and a body to record actual data (e.g., transaction data). The chain of blocks are linked via the block headers. Each block header may contain multiple feature values, such as version, previous block hash, merkle root, timestamp, difficulty target, and nonce. The previous block hash contains not only the address of the previous block, but also the hash of the data inside the previous block, thus making the blockchains immutable. The nonce is a number which, when included, yields a hash with a specified number of leading zero bits.

For mining, the hash of the contents of the new block is taken by a node. The nonce (e.g., random string) is appended to the hash to obtain a new string. The new string is hashed again. The final hash is then compared to the difficulty target (e.g., a level) and determined whether the final hash is actually less than the difficulty target or not. If not, then the nonce is changed and the process repeats again. If yes, then the block is added to the chain and the public ledger is updated and alerted of the addition. The node responsible for the successful addition is rewarded with bitcoins, for example, by adding a reward transaction to itself into the new block (known as coinbase generation).

That is, for every output "Y", if k is chosen from a distribution with high min-entropy it is infeasible to find an input x such that $H(k|x)=Y$, where K is the nonce, x is the hash of the block, Y is the difficulty target, and "|" denotes concatenation. On account of cryptographic hashes being essentially random, in the sense that their output cannot be predicted from their inputs, there is only one known way to find the nonce: to try out integers one after the other, for example 1, then 2, then 3, and so on, which may be known as brute-force. The larger the number of leading zeros, the longer on average it will take to find a requisite nonce Y. In one example, the bitcoin system constantly adjusts the number of leading zeros, so that the average time to find a nonce is about ten minutes. That way, as processing capabilities of computing hardware increase with time, over the years, the bitcoin protocol will simply require more leading zero bits to make mining always take a duration of about ten minutes to implement.

As described, hashing is an important cornerstone for blockchain. The hash algorithm can be understood as a function that compresses messages of any length into a fixed-length message digest. More commonly used are MD5 and SHA. In some embodiments, the hash length of the blockchain is 256 bits, which means that no matter what the original content is, a 256-bit binary number is finally calculated. And it can be guaranteed that the corresponding hash is unique as long as the original content is different. For example, the hash of the string "123" is a8fdc205a9f19cc1c7507a60c4f01b13d11d7fd0 (hexadecimal), which has 256 bits when converted to binary, and only "123" has this hash. The hash algorithm in the blockchain is irreversible, that is, the forward calculation is easy (from "123" to a8fdc205a9f19cc1c7507a60c4f01b1c7507a60c4f01b13d11-d7fd0), and the reverse calculation cannot be done even if all computing resources are exhausted. Thus, the hash of each block of the blockchain is unique.

Further, if the content of the block changes, its hash will change. The block and the hash are in one-to-one correspondence, and the hash of each block is specifically calculated for the block header. That is, the feature values of the block headers are connected to form a long string, and then the hash is calculated for the string. For example, "Hash=SHA256 (block header)" is a block hash calculation formula, SHA256 is a blockchain hash algorithm applied to block header. The hash is uniquely determined by the block header, and not the block body. As mentioned above, the block header contains a lot of content, including the hash of the current block, and the hash of the previous block. This means that if the contents of the current block change, or if the hash of the previous block changes, it will cause a hash change in the current block. If hacker modifies a block, the hash of that block changes. In order for a later block to connect to the modified block, the hacker must modify all subsequent blocks in turn, because the next block must contain the hash of the previous block. Otherwise the modified block will be detached from the blockchain. Due to design reasons, hash calculations are time-consuming, and it is almost impossible to modify multiple blocks in a short period of time unless the hacker has mastered more than 51% of the computing power of the entire network. Thus, the blockchain guarantees its own reliability, and once the data is written, it cannot be tampered with.

Once the miner finds the hash (that is, an eligible signature or solution) for the new block, the miner broadcasts this signature to all the other miners (nodes of the blockchain). Other miners now verify in their turn if that solution corresponds with the problem of the sender's block (that is, determine if the hash input actually results in that signature). If the solution is valid, the other miners will confirm the solution and agree that the new block can be added to the blockchain. Thus, the consensus of the new block is reached. This is also known as "proof of work." The block for which consensus has been reached can now be added to the blockchain and is broadcast to all nodes on the network along with its signature. The nodes will accept the block and save it to their transaction data as long as the transactions inside the block correspond correctly with the current wallet balances (transaction history) at that point in time. Every time a new block gets added on top of this block, the addition also counts as another "confirmation" for the blocks before it. For example, if a transaction is included in block 502, and the blockchain is 507 blocks long, it means the transaction has five confirmations (corresponding to blocks 507 to 502). The more confirmations the transaction has, the harder it is for attackers to alter.

In some embodiments, an exemplary blockchain asset system utilizes public-key cryptography, in which two cryptographic keys, one public key and one private key, are generated. The public key can be thought of as being an account number, and the private key can be thought of as being ownership credentials. For example, a bitcoin wallet is a collection of the public and private keys. Ownership of an asset (e.g., digital currency, cash asset, stock, equity, bond) associated with a certain asset address can be demonstrated with knowledge of the private key belonging to the address. For example, bitcoin wallet software, sometimes referred as being "bitcoin client software", allows a given user to transact bitcoins. A wallet program generates and stores private keys and communicates with peers on the bitcoin network. The public and private keys may be referred to as asymmetric encryption keys (or asymmetrical encryption keys).

In blockchain transactions, payers and payees are identified in the blockchain by their public cryptographic keys. For example, most contemporary bitcoin transfers are from one public key to a different public key. In practice hashes of these keys are used in the blockchain and are called "bitcoin addresses." In principle, if a hypothetical attacker person S could steal money from person A by simply adding transactions to the blockchain ledger like "person A pays person S 100 bitcoins," using the users' bitcoin addresses instead of their names. The bitcoin protocol prevents this kind of theft by requiring every transfer to be digitally signed with the payer's private key, and only signed transfers can be added to the blockchain ledger. Since person S cannot forge person A's signature, person S cannot defraud person A by adding an entry to the blockchain equivalent to "person A pays person S 200 bitcoins." At the same time, anyone can verify person A's signature using his/her public key, and therefore that he/she has authorized any transaction in the blockchain where he/she is the payer.

In the bitcoin transaction context, to transfer some bitcoins to user B, user A may construct a record containing information about the transaction through a node. The record may be signed with user A's signing key (private key) and contains user A's public verification key and user B's public verification key. The signature is used to confirm that the transaction has come from the user, and also prevents the transaction from being altered by anyone once it has been issued. The record bundled with other record that took place in the same time window in a new block may be broadcast to the full nodes. Upon receiving the records, the full nodes may work on incorporating the records into the ledge of all transactions that have ever taken place in the blockchain system, adding the new block to a previously-accepted blockchain through the above-described mining process, and validate the added block against the network's consensus rules.

UTXO (unspent transaction output) model and Account/Balance model are two exemplary models for implementing blockchain transactions. UTXO is a blockchain object model. Under UTXO, assets are represented by outputs of blockchain transactions that have not been spent, which can be used as inputs in new transactions. For example, user A's asset to be transferred may be in a form of UTXO. To spend (transact) the asset, user A has to sign off with the private key. Bitcoin is an example of a digital currency that uses UTXO model. In the case of a valid blockchain transaction, unspent outputs may be used to effect further transactions. In some embodiments, only unspent outputs may be used in further transactions to prevent double spending and fraud. For this reason, inputs on a blockchain are deleted when a transaction occurs, whilst at the same time, outputs are created in the form of UTXOs. These unspent transaction outputs may be used (by the holders of private keys, for example, persons with digital currency wallets) for the purpose of future transactions.

Account/Balance Model (or referred to as Account-based Transaction Model), on the other hand, keeps track of the balance of each account as a global state. The balance of an account is checked to make sure it is larger than or equal to the spending transaction amount. An example of how Account/Balance Model works in Ethereum is provided:

1. Alice gains 5 ethers through mining. It is recorded in the system that Alice has 5 ethers.

2. Alice wants to give Bob 1 ether, so the system will first deduct 1 ether from Alice's account, so Alice now has 4 ethers.

3. The system then increases Bob's account by 1 ether. The system knows that Bob has 2 ethers to begin with, therefore Bob's balance is increased to 3 ethers.

The record-keeping for Ethereum may be like that in a bank. An analogy is using an ATM/debit card. The bank tracks how much money each debit card has, and when Bob needs to spend money, the bank checks its record to make sure Bob has enough balance before approving the transaction.

Since the blockchain and other similar ledgers are completely public, the blockchain itself has no privacy protection. The public nature of P2P network means that, while those who use it are not identified by name, linking transactions to individuals and companies is feasible. For example, in cross-border remittances or in the supply chain, transaction amount has an extremely high level of privacy protection value, because with the transaction amount information, it is possible to infer the specific location and identities of the transaction parties. The subject matter of the transaction may comprise, for example, money, token, digital currency, contract, deed, medical record, customer detail, stock, bond, equity, or any other asset that can be described in digital form. Though UTXO model may provide anonymity to transaction amounts, for example, through ring signature in Monero and zero-knowledge cryptography Zcash, transaction amounts remain unprotected under Account/Balance Model. Thus, a technical problem address by the present disclosure is how to protect online information such as the privacy of transaction amounts. Such transactions may be under Account/Balance Model.

Some existing technologies propose to use the Pedersen commitment scheme to encrypt the transaction amount and replace Account/Balance Model. Under the scheme, the sender sends the transaction amount and a random number corresponding to the Pedersen commitment of the transaction amount to the payee through a secured channel off the blockchain. The payee verifies if the random number matches the transaction commitment and performs local storage. For example, under Account/Balance Model, an account can be treated as a wallet (account) for keeping assets that are aggregated but not merged. Each asset may correspond to an asset type (e.g., cryptocurrency), and the balance of the account is the sum of the asset values. Even assets of the same type are not merged. During transaction, a recipient of a transferring asset may be specified, and corresponding asset may be removed from the wallet to fund the transaction. The blockchain nodes verify that the paying wallet has sufficient asset(s) to cover the transaction, and then the nodes delete the transferred asset from the paying wallet and add a corresponding asset to a recipient wallet.

However, limitations still exist for such scheme. First, the scheme requires the user to maintain a persistent storage locally to manage the random numbers and plaintext balances corresponding to the encrypted account balance, and the management implementation is complicated; second, the storage of blinding factors (e.g., the random numbers) and the plaintext balances corresponding to the "Pedersen asset" in a single local node is prone to loss or corruption, while multi-node backup storage is difficult to realize due to the frequent change of the account balance.

The systems and method presented in this disclosure may overcome the above limitations and achieve robust privacy protection for transaction amounts, asset values, and blinding factors in commitment schemes. To that end, public-private keys may be used to encrypt/decrypt the random numbers and the plaintext balances, thus providing convenient management. Further, storing the encrypted information in blockchain ensures that the transaction amounts, asset values, and blinding factors in commitment schemes are not easily lost or tampered with.

In some embodiments, a commitment scheme (e.g., Pedersen commitment) may encrypt certain value a (e.g., transaction amount, asset value, key parameter) as follows:

$$PC(a)=r\times G+a\times H$$

where r is a random blinding factor (alternatively referred to as binding factor) that provides hiding, G and H are the publicly agreed generators/basepoints of the elliptic curve and may be chosen randomly, a is the value of the commitment, PC(a) is the curve point used as commitment and given to the counterparty, and H is another curve point. That is, G and H may be known parameters to nodes. A "nothing up my sleeve" generation of H may be generated by hashing the basepoint G with a hash function mapping from a point to another with H=Hash(G). H and G are the public parameters of the given system (e.g., randomly generated points on an elliptic curve). Although the above provides an example of Pedersen commitment in elliptic curve form, various other forms of Pedersen commitment or other commitment schemes may be alternatively used.

A commitment scheme maintains data secrecy but commits to the data so that it cannot be changed later by the sender of the data. If a party only knows the commitment value (e.g., PC(a)), they cannot determine what underlying data values (e.g., a) have been committing to. Both the data (e.g., a) and the blinding factor (e.g., r) may be revealed later (e.g., by the initiator node), and a recipient (e.g., consensus node) of the commitment can run the commitment and verify that the committed data matches the revealed data. The blinding factor is present because without one, someone could try guessing at the data.

Commitment schemes are a way for the sender (committing party) to commit to a value (e.g., a) such that the value committed remains private, but can be revealed at a later time when the committing party divulges a necessary parameter of the commitment process. Strong commitment schemes may be both information hiding and computationally binding. Hiding refers to the notion that a given value a and a commitment of that value PC(a) should be unrelatable. That is, PC(a) should reveal no information about a. With PC(a), G, and H known, it is almost impossible to know a because of the random number r. A commitment scheme is binding if there is no plausible way that two different values can result in the same commitment. A Pedersen commitment is perfectly hiding and computationally binding under the discrete logarithm assumption. Further, with r, G, H, and PC(a) known, it is possible to verify PC(a) by determining if PC(a)=r×G+a×H.

A Pedersen commitment has an additional property: commitments can be added, and the sum of a set of commitments is the same as a commitment to the sum of the data (with a blinding factor set as the sum of the blinding factors): $PC(r_1, data_1)+PC(r_2, data_2)==PC(r_1+r_2, data_1+data_2)$; $PC(r_1, data_1)-PC(r_1, data_1)==0$. In other words, the commitment preserves addition and the commutative property applies, i.e., the Pedersen commitment is additively homomorphic, in that the underlying data may be manipulated mathematically as if it is not encrypted.

In one embodiment, a Pedersen commitment used to encrypt the input value may be constructed using elliptic curve points. Conventionally, an elliptic curve cryptography (ECC) pubkey is created by multiplying a generator for the group (G) with the secret key (r): Pub=rG. The result may be serialized as a 33-byte array. ECC public keys may obey the additively homomorphic property mentioned before with respect to Pedersen commitments. That is: $Pub1+Pub2=(r1+r2(\bmod n))G$.

The Pedersen commitment for the input value may be created by picking an additional generator for the group (H, in the equations below) such that no one knows the discrete log for second generator H with respect to first generator G (or vice versa), meaning no one knows an x such that xG=H. This may be accomplished, for example, by using the cryptographic hash of G to pick H: H=to_point(SHA256 (ENCODE(G))).

Given the two generators G and H, an exemplary commitment scheme to encrypt the input value may be defined as: commitment=rG+aH. Here, r may be the secret blinding factor, and a may be the input value being committing to. Hence, if a is committed, the above-described commitment scheme PC(a)=r×G+a×H can be obtained. The Pedersen commitments are information-theoretically private: for any commitment, there exists some blinding factor which would make any amount match the commitment. The Pedersen commitments may be computationally secure against fake commitment, in that the arbitrary mapping may not be computed.

The party (node) that committed the value may open the commitment by disclosing the original value a and the factor r that completes the commitment equation. The party wishing to open the value PC(a) will then compute the commitment again to verify that the original value shared indeed matches the commitment PC(a) initially received. Thus, the asset type information can be protected by mapping it to a unique serial number, and then encrypting it by Pedersen commitment. The random number r chosen when generating the commitment makes it almost impossible for anyone to infer the type of asset type that is committed according to the commitment value PC(a).

During transactions, information protection is important to secure user privacy, and transaction amount is one type of information that has lacked protection. FIG. 1 shows an exemplary system 100 for information protection, in accordance with various embodiments. As shown, a blockchain network may comprise a plurality of nodes (e.g., full nodes implemented in servers, computers, etc.). For some blockchain platform (e.g., NEO), full nodes with certain level of voting power may be referred to as consensus nodes, which assume the responsibility of transaction verification. In this disclosure, full nodes, consensus nodes, or other equivalent nodes can verify the transaction.

Also, as shown in FIG. 1, user A and user B may use corresponding devices, such as laptops and mobile phones serving as lightweight nodes to perform transactions. For example, user A may want to transact with user B by transferring some asset in user A's account to user B's account. User A and user B may use corresponding devices installed with an appropriate blockchain software for the transaction. User A's device may be referred to as an initiator node A that initiates a transaction with user B's device referred to as recipient node B. Node A may access the blockchain through communication with node 1, and Node B may access the blockchain through communication with node 2. For example, node A and node B may submit transactions to the blockchain through node 1 and node 2 to request adding the transactions to the blockchain. Off the blockchain, node A and node B may have other channels of communication (e.g., regular internet communication without going through nodes 1 and 2).

Each of the nodes in FIG. 1 may comprise a processor and a non-transitory computer-readable storage medium storing instructions to be executed by the processor to cause the node (e.g., the processor) to perform various steps for information protection described herein. The each node may be installed with a software (e.g., transaction program) and/or hardware (e.g., wires, wireless connections) to communicate with other nodes and/or other devices. Further details of the node hardware and software are described later with reference to FIG. 5.

Figure 2:
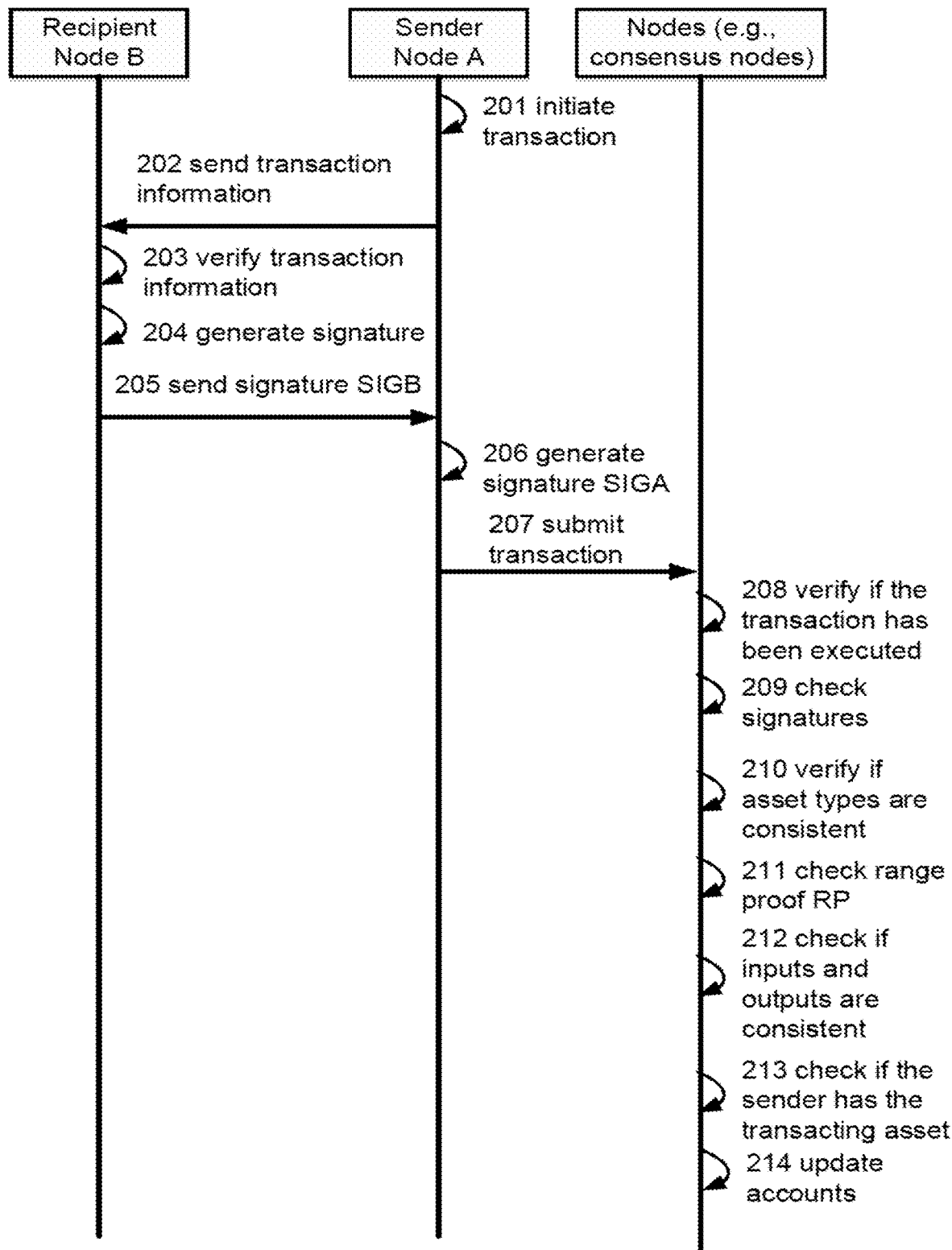
FIG. 2 illustrates exemplary steps for transaction initiation and verification, in accordance with various embodiments.

FIG. 2 illustrates exemplary steps for transaction and verification among a sender node A, a recipient node B, and one or more verifying nodes, in accordance with various embodiments. The operations presented below are intended to be illustrative. Depending on the implementation, the exemplary steps may include additional, fewer, or alternative steps performed in various orders or in parallel.

In various embodiments, accounts of transaction parties (sender user A and recipient user B) are configured for Account/Balance model. User A and user B may perform the following steps to carry out the transaction via one or more devices, such as their laptop, mobile phone, etc. The devices may be installed with appropriated software and hardware to perform the various steps. Each account may be associated with a cryptographic private key (secret key)-public key pair. The private key may be denoted as $SK=x$, and the public key may be denoted as $PK=xG$, where G is a generator of the group. Each account may contain various assets, each denoted as: $(V=PC(r, v), E(K, r, v))$, where v represents the face value of the asset, V represents a Pedersen commitment of the face value v, r is a blinding factor (e.g., a random number), PC( ) is a Pedersen commitment algorithm, E( ) is an encryption algorithm (e.g., asymmetric key encryption algorithm), and K is an encryption key. In one example, the each asset may be denoted as $(V=PC(r, v), E(K, r||v)$, where || represents concatenation. Each asset may also include information other than that listed, such as the source information of the asset.

In one example, before user A successfully transacts an amount t to user B in a blockchain-verified transaction, the addresses of and assets in A's account and B's account are as follows:

For A's Account (account A):
Address: (SK_A=a, PK_A=aG)
Assets A_1 to A_m respectively of values a_1 to a_m are denoted as:

(A_1 = $PC(r\_\{a\_1\}, a\_1), E(PK\_A, r\_\{a\_1\}||a\_1)$), (A_2 = $PC(r\_\{a\_2\}, a\_2), E(PK\_A, r\_\{a\_2\}||a\_2)$),

...

(A_m = $PC(r\_\{a\_m\}, a\_m), E(PK\_A, r\_\{a\_m\}||a\_m)$)

For B's Account (account B):
Address: (SK_B=b, PK_B=bG)
Assets B_1 to B_n respectively of values b_1 to b_n are denoted as:

(B_1 = $PC(r\_\{b\_1\}, b\_1), E(PK\_B, r\_\{b\_1\}||b\_1)$), (B_2 = $PC(r\_\{b\_2\}, b\_2), E(PK\_B, r\_\{b\_2\}||b\_2)$),

...

(B_n = $PC(r\_\{b\_n\}, b\_n), E(PK\_B, r\_\{b\_n\}||b\_n)$)

In some embodiments, the key generation may be based on elliptic curve ecp256k1 for each account under the Account/Balance model. For example, on Ethereum ecp256k1, any number between 1 to $2^{256}-1$ may be a valid private key SK. A good library generates a private key with taking sufficient randomness into account. Ethereum requires private key SK to be 256 bit long. The public key generation is done using group operation of ECC cryptography. To derive public key PK, private key may be multiplied by G. The multiplication used to derive the public key PK is ECC multiplication (elliptic curve point multiplication), which is different from normal multiplication. G is the generator point which is one of the domain parameters of ECC cryptography. G may have a fixed value for ecp256k1. The address may be, for example, the last 20 bytes of the hash of the public key PK.

In some embodiments, at step 201, node A may initiate a transaction with node B. For example, user A and user B may negotiate a transaction amount t from user A's account A to user B's account B. Account A and account B may correspond to the "wallets" described herein. Account A may have one or more assets. The asset may comprise, for example, money, token, digital currency, contract, deed, medical record, customer detail, stock, bond, equity, or any other asset that can be described in digital form. Account B may have one or more assets or no asset. Each asset may be associated with various blockchain information stored in blocks of the blockchain, the blockchain information comprising, for example, NoteType representing asset type, NoteID representing unique identification of asset, commitment values representing a commitment (e.g., Pedersen commitment) value of the asset value, encryption of random number and asset value, etc.

As described with respect to account A, in some embodiments, assets $A\_1$ to $A\_m$ respectively correspond to asset values $a\_1$ to $a\_m$ and random numbers $r\_1$ to $r\_m$. Based on the random numbers $r\_1$ to $r\_m$, node A may commit the asset values in account A to a commitment scheme (e.g., Pedersen commitment) to obtain encrypted commitment values. For example, the encrypted commitment values may be $PC\_1$ to $PC\_m$, where $PC\_i=PC(r\_\{a\_i\}, a\_i)=r\_\{a\_i\} \times G + a\_i \times H$, where G and H are known parameters, and i is between 1 and m. In addition to the first field PC( . . . ), each asset is also associated with a second field E( . . . ) as described earlier. The second field E( . . . ) may represent an encryption of the corresponding random number and asset value encrypted with key $PK\_A$. For example, the encryption may be $E(PK\_A, r\_\{a\_i\}\|a\_i))$. The PC( . . . ) and E( . . . ) for each asset may be inherited from previous transactions. The same mechanism may apply to account B and its assets.

In some embodiments, to satisfy the transaction amount t, user A may use the private key $SK\_A$ to decrypt one or more assets of an aggregated value at least t from account A. For example, node A may tap assets $A\_1, A\_2, \ldots, A\_k$ for this transaction, where k is less than or equal to m. The remaining assets $A\_k+1, A\_k+2, \ldots, A\_m$ of account A are untapped. Correspondingly, node A may read assets $PC(r\_\{a\_1\}, a\_1), PC(r\_\{a\_2\}, a\_2), \ldots, PC(r\_\{a\_k\}, a\_k)$ from node 1. With the random numbers $r\_\{a\_1\}, r\_\{a\_2\}, \ldots, r\_\{a\_k\}$ known to node A, node A can decrypt the read assets $PC(r\_\{a\_1\}, a\_1), PC(r\_\{a\_2\}, a\_2), \ldots, PC(r\_\{a\_k\}, a\_k)$ to obtain asset values $a\_1, a\_2, \ldots, a\_k$ to ensure that the sum $(a\_1+a\_2+ \ldots +a\_k)$ is no less than the transaction amount t. Different assets may be exchanged to one another within the account based on various rates.

In some embodiments, the amount of selected asset value in excess of t, if any, is set to y as the change. For example, node A may determine the change $y=(a\_1+a\_2+ \ldots +a\_k)-t$. Node A may select random numbers $r\_t$ and $r\_y$ as blinding factors to generate Pedersen commitments for t and y: $T=PC(r\_t, t), Y=PC(r\_y, y)$. That is, node A may generate a random number $r\_t$ for t and a random number $r\_y$ for y. Node A can commit t and $r\_t$ to a commitment scheme to obtain commitment value $T=PC(r\_t, t)$, and commit y and $r\_y$ to a commitment scheme to obtain commitment value $Y=PC(r\_y, y)$.

Further, in some embodiments, node A may use user B's public key $PK\_B$ to encrypt $(r\_t\|t)$, which gives encryption $E(PK\_B, r\_t\|t)$, and use user A's public key $PK\_A$ to encrypt $(r\_y\|y)$, which gives encryption $E(PK\_A, r\_y\|y)$. FIG. 3A and FIG. 3B may follow this example. Alternative to obtaining the encryption $E(PK\_B, r\_t\|t)$ by node A, user A may send $r\_t$ and t to node B along with the transaction information, causing node B to generate a second key to encrypt $(r\_t\|t)$ with $PK\_B$. Node B would send the encryption to node A to allow node A to verify. FIG. 4A and FIG. 4B may follow this example. Though concatenation is used in various examples of this disclosure, alternative combinations of inputs, outputs, or other parameters may be used for the encryption function or another operation.

Further, in some embodiments, node A may generate a range proof RP to prove to blockchain nodes if the value of $T=PC(r\_t, t)$ and the value of $Y=PC(r\_y, y)$ are each within a valid range. For example, to have valid values of $T=PC(r\_t, t)$, the transaction amount t may be within a valid range $[0, 2^n-1]$; and to have valid values of $Y=PC(r\_y, y)$, the change y may be within a valid range $[0, 2^n-1]$. In one embodiment, node A can use the block proof technique to generate the range proof RP related to $(r\_y, y, Y, t, T)$ for the blockchain nodes (e.g., consensus nodes) to verify at a later step whether the transaction amount t and the change y are within the valid range based on the range proof. The range proof may comprise, for example, Bulletproofs, Borromean ring signature, etc.

At step 202, node A may send the transaction information to node B (e.g., through a secured channel off the blockchain). The sent transaction information may comprise, for example, commitment value $T=PC(r\_t, t)$, commitment value $Y=PC(r\_y, y)$, encryption $E(PK\_B, r\_t\|t)$, encryption $E(PK\_A, r\_y\|y)$, range proof RP, etc. The commitment value $Y=PC(r\_y, y)$, encryption $E(PK\_A, r\_y\|y)$, and range proof RP may be optional because node B may not care about the change sent back to account A. In some embodiments, the transmission via the off-blockchain communication channel can prevent the transaction information from being recorded into the blockchain and prevent nodes other than the sender node A and the recipient node B from obtaining the transaction information. $E(PK\_A, r\_y\|y)$ may not need to be sent to node B, but may be needed in future for user A to spend the change y since the change is to be returned to account A.

At step 203, node B may verify the random number $r\_t$, the transaction amount t, and the commitment value T. In some embodiments, node B may use the private key $SK\_B$ to decrypt the encryption $E(PK\_B, r\_t\|t)$ to obtain $r\_t\|t$. From $r\_t\|t$, node B may obtain $r\_t$ and t, and then verify if $r\_t$ and t match $T=PC(r\_t, t)$. That is, node B may verify if the commitment value $T=PC(r\_t, t)$ is correct based on the random number $r\_t$ and the transaction amount t according to Pedersen commitment algorithm. If the match/verification fails, node B may reject the transaction; and if the match/verification succeeds, node B may sign the transaction to reply node A at step 204.

At step 204, node B may sign the transaction with user B's private key $SK\_B$ to generate a signature SIGB. The signing may follow Digital Signature Algorithm (DSA) such as Elliptic Curve Digital Signature Algorithm (ECDSA), whereby the receiver of the signature can verify the signature with the signator's public key to authenticate the signed data. The signature SIGB indicates that the recipient node B agrees to the transaction.

At step 205, node B may transmit the signed transaction back to node A with the signature SIGB.

At step 206, if SIGB is not successfully verified, node A may reject the transaction. If SIGB is successfully verified, node A may sign the transaction with user A's private key $SK\_A$ to generate a signature SIGA. Similarly, the signing may follow the Digital Signature Algorithm (DSA). In one embodiment, node A may sign $(E(PK\_B, r\_t\|t); E(PK\_A, r\_y\|y); Y; T; RP)$ with user A's private key $SK\_A$ to generate the signature SIGA.

At step 207, node A may submit the transaction to the blockchain, causing the blockchain nodes to verify the transaction and determine whether to add the transaction to the blockchain. In one embodiment, node A may submit the transaction $(E(PK\_B, r\_t\|t); E(PK\_A, r\_y\|y); Y; T; r'; RP; SIGA; SIGB)$ to the blockchain via node 1 to execute the transaction. $r'=r\_1+ \ldots +r\_k-r\_t-r\_y$. The transaction may comprise additional parameters or may not comprise all of the listed parameters. The transaction may be broadcast to one or more nodes (e.g., consensus nodes) in the blockchain for verification. If the verification succeeds, the transaction is added to the blockchain. If the verification fails, the transaction is rejected from adding to the blockchain.

At steps 208-213, the one or more nodes (e.g., consensus nodes) verify the signatures, range proof, and other information of the submitted transaction. If the verification fails, the nodes reject the transaction. If the verification succeeds, the nodes accept the transaction, update user A's account and user B's account separately.

In some embodiments, to execute the transaction, transaction information may be verified by various blockchain nodes. The transaction information may comprise transaction address TXID, signature(s), input, and output. TXID may comprise the hash of the transaction content. The signatures may comprise crypto-key signatures by the sender and recipient. The input may comprise an address of the sender's account in blockchain, one or more assets tapped from the sender's blockchain account for transaction, etc. The output may comprise an address of the recipient's account in blockchain, asset type(s) of the recipient asset(s), commitment value(s) of the recipient asset(s), etc. The input and output may comprise indexed information in a tabular form. In some embodiments, the value of NoteID value can be "the TXID+an index of the asset in the output." The public key PK_A of the sender may serve as the address for account A, and the public key PK_B of the recipient may serve as the address for account B.

In some embodiments, the one or more nodes of the blockchain may verify the submitted transaction (E(PK_B, r_t||t); E(PK_A, r_y||y); Y; T; RP; SIGA; SIGB).

At step 208, the nodes may verify whether the transaction has been executed using an anti-double-spending mechanism or anti-replay-attack mechanism. If the transaction has been executed, the nodes may reject the transaction; otherwise, the method may proceed to step 209.

At step 209, the nodes may check the signatures SIGA and SIGB (for example, based on A's public key and B's public key respectively). If any of the signatures is incorrect, the nodes may reject the transaction; otherwise, the method may proceed to step 210.

At optional step 210, the nodes may verify if the asset types are consistent. For example, the nodes may verify if the asset types in the NoteType for A_1 to A_k are consistent with the asset type(s) of the transaction amount t. If any of the asset types is inconsistent, the nodes may reject the transaction; otherwise, the method may proceed to step 211. In some embodiments, the original asset type in the wallet may have been converted to another type based on an exchange rate, and this step may be skipped.

At step 211, the nodes may check the range proof RP to validate the value of PC(r_t, t) and the value of PC(r_y, y). In one embodiment, the nodes may check the range proof RP to verify whether the transaction amount t is no less than zero and the change y is no less than zero. If the verification fails, the nodes may reject the transaction; otherwise, the method may proceed to step 212.

At step 212, the nodes may check if the inputs and the outputs of the transaction are consistent. In one embodiment, r' may correspond to asset value t'=a_1+ . . . +a_k−t−y based on the homomorphic property, where r'=r_1+ . . . +r_k−r_t−r_y. Since the input assets are a_1 to a_k and the output is t+y, t'=0 when the input and output are consistent: a_1+ . . . a_k=t+y. Thus, the commitment value corresponding to r' is PC(r', t')=r'×G+t'×H=r'G. Since r'=r_1+ . . . +r_k−r_t−r_y, the nodes can determine if the inputs and outputs are equal by verifying if r'G is equal to PC_1+ . . . +PC_k−T−Y corresponding to r_1+ . . . +r_k−r_t−r_y. If r'G is equal to PC_1+ . . . +PC_k−T−Y, the nodes may determine that the inputs and the outputs of the transaction are consistent and proceed to the next step; otherwise, the nodes may determine that the inputs and the outputs of the transaction are inconsistent and reject the transaction.

At step 213, the nodes may verify if node A has the asset(s) tapped for the transaction. In one embodiment, the nodes may perform this verification based on information stored in the blockchain, such as information corresponding to account A. The information may comprise previous transaction information of all assets. The nodes can thus determine if account A has the transacting asset for the transaction. If the determination is no, the nodes may reject the transaction; otherwise, the method may proceed to step 214.

At step 214, the nodes may update the account A and account B. For example, the nodes may remove the transacting asset of amount t from account A, and add the same to account B. Based on the homomorphic property, since Y=PC(r_y, y) and node 1 knows r_y and can access the commitment value Y from the blockchain, node 1 can decrypt Y to obtain the asset value y and return the same to account A. Node 2 obtains at step 202 the random number r_t from node 1 and can obtain from the blockchain the commitment value T. Thus, node 2 can decrypt T to obtain the asset value t and add the same to account B.

In one example, after the update to account A and account B, account A receives the change y to the tapped assets A_1, A_2, A_k and receives its untapped assets A_k+1, A_m, and account B receives the transaction amount t and receives its original assets B_1, B_2, B_n. The assets in A's account and B's account are as follows:

For A's Account (account A), updated assets are denoted as:

$(Y = PC(r\_y, y), E(PK\_A, r\_y||y))$, $(A\_k+1 = PC(r\_\{a\_k+1\}, a\_k+1)$, $E(PK\_A, r\_\{a\_k+1\}||a\_k+1))$ $(A\_k+2 = PC(r\_\{a\_k+2\}, a\_k+2)$, $E(PK\_A, r\_\{a\_k+2\}||a\_k+2))$

. . .

$(A\_m = PC(r\_\{a\_m\}, a\_m), E(PK\_A, r\_\{a\_m\}||a\_m))$

For B's Account (account B), updated assets are denoted as:

$(B\_1 = PC(r\_\{b\_1\}, b\_1), E(PK\_B, r\_\{b\_1\}||b\_1))$, $(B\_2 = PC(r\_\{b\_2\}, b\_2), E(PK\_B, r\_\{b\_2\}||b\_2))$,

. . .

$(B\_n = PC(r\_\{b\_n\}, b\_n), E(PK\_B, r\_\{b\_n\}||b\_n))$ $(T = PC(r\_t, t), E(PK\_B, r\_t||t))$

Although this disclosure uses node A/user A and node B/user B to illustrate the sender and recipient respectively, the sender and the recipient can be the same node/user. For example, the change y of a transaction (total tapped assets in account A minus the transaction amount) may be sent back to the sender of the transaction. Thus, the various steps performed by node B as described herein may alternatively be performed by node A.

FIG. 3A illustrates a flowchart of an exemplary method 300 for information protection, according to various embodiments of the present disclosure. The method 300 may be implemented by one or more components (e.g., node A, node 1, a combination of node A and node 1) of the system 100 of FIG. 1. The method 300 may be implemented by a system or device (e.g., computer, server) comprising a processor and a non-transitory computer-readable storage medium (e.g., memory) storing instructions to be executed by the processor to cause the system or device (e.g., the processor) to perform the method 300. The operations of method 300 presented below are intended to be illustrative. Depending on the implementation, the exemplary method 300 may include additional, fewer, or alternative steps performed in various orders or in parallel.

Block 301 comprises: committing a transaction amount t of a transaction with a commitment scheme to obtain a transaction commitment value T, the commitment scheme comprising at least a transaction blinding factor r_t. For example, as described earlier, T=PC(r_t, t). In some embodiments, the commitment scheme comprises a Pedersen commitment based at least on the transaction blinding factor r_t and with the transaction amount t being a committed value.

Block 302 comprises: encrypting a combination of the transaction blinding factor r_t and the transaction amount t with a public key PK_B of a recipient of the transaction. For example, node A may use the key PK_B to encrypt (r_t∥t), which gives encryption E(PK_B, r_t∥t). In some embodiments, the public key PK_B is an asymmetric encryption key. In some embodiments, the combination of the transaction blinding factor r_t and the transaction amount t comprises a concatenation of the transaction blinding factor r_t and the transaction amount t.

Block 303 comprises: transmitting the transaction commitment value T and the encrypted combination to a recipient node associated with the recipient for the recipient node to verify the transaction (e.g., causing the recipient node to verify the transaction). In some embodiments, transmitting the transaction commitment value T and the encrypted combination to the recipient node associated with the recipient for the recipient node to verify the transaction comprises transmitting the transaction commitment value T and the encrypted combination to the recipient node associated with the recipient, causing the recipient node to: decrypt the encrypted combination with a private key SK_B of the recipient to obtain the transaction blinding factor r_t and the transaction amount t; and verify the transaction based at least on the transaction commitment value T, the transaction blinding factor r_t, and the transaction amount t. See, e.g., Step 203.

In some embodiments, causing the recipient node to verify the transaction based at least on the transaction commitment value T, the transaction blinding factor r_t, and the transaction amount t comprises causing the recipient node to: in response to determining that the transaction commitment value T does not match the commitment scheme of the transaction amount t based on the transaction blinding factor r_t, reject the transaction; and in response to determining that the transaction commitment value T matches the commitment scheme of the transaction amount t based on the transaction blinding factor r_t, approve the transaction by signing the transaction with the private key SK_B of the recipient to generate a recipient signature SIGB.

In some embodiments, before (block 304) transmitting the encrypted combination to the recipient node associated with the recipient, the method further comprises: committing a change y of the transaction with the commitment scheme to obtain a change commitment value Y, the commitment scheme comprising at least a change blinding factor r_y, wherein the change y is one or more assets of a sender of the transaction that are tapped for the transaction less the transaction amount t; and encrypting another combination of the change blinding factor r_y and the change y with a public key PK_A of the sender. For example, node A may use the key PK_A to encrypt (r_y∥y), which gives encryption E(PK_A, r_y∥y).

In some embodiments, the method further comprises: in response to receiving the recipient signature SIGB, approving the transaction by signing the transaction with a private key SK_A of the sender to generate a sender signature SIGA; and submitting the transaction comprising the encrypted combination, the encrypted another combination, the transaction commitment value T, the change commitment value Y, the sender signature SIGA, and the recipient signature SIGB to one or more nodes in a blockchain network for the one or more nodes to verify the transaction. More details are described above with reference to Steps 208-213.

In some embodiments, submitting the transaction comprising the encrypted combination, the encrypted another combination, the transaction commitment value T, the change commitment value Y, the sender signature SIGA, and the recipient signature SIGB to the one or more nodes in the blockchain network for the one or more nodes to verify the transaction comprises: submitting the transaction comprising the encrypted combination, the encrypted another combination, the transaction commitment value T, the change commitment value Y, the sender signature SIGA, and the recipient signature SIGB to the one or more nodes in the blockchain network, causing the one or more nodes to, in response to successfully verifying the transaction, issue the transaction amount t to the recipient, eliminate the one or more assets tapped for the transaction, and issue the change y to the sender. More details are described above with reference to Step 214.

FIG. 3B illustrates a flowchart of an exemplary method 400 for information protection, according to various embodiments of the present disclosure. The method 400 may be implemented by one or more components (e.g., node B, node 2, a combination of node B and node 2, etc.) of the system 100 of FIG. 1. The method 400 may be implemented by a system or device (e.g., computer, server) comprising a processor and a non-transitory computer-readable storage medium (e.g., memory) storing instructions to be executed by the processor to cause the system or device (e.g., the processor) to perform the method 400. The operations of the method 400 presented below are intended to be illustrative. Depending on the implementation, the exemplary method 400 may include additional, fewer, or alternative steps performed in various orders or in parallel.

Block 401 comprises: obtaining a combination of a transaction blinding factor r_t and a transaction amount t encrypted with a public key PK_B of a recipient of a transaction, and obtaining a transaction commitment value T, wherein: the transaction amount t is committed with a commitment scheme by a sender node associated with a sender of the transaction to obtain the transaction commitment value T, the commitment scheme comprising at least the transaction blinding factor r_t.

Block 402 comprises: decrypting the obtained combination with a private key SK_B of a recipient of the transaction to obtain the transaction blinding factor r_t and the transaction amount t. In some embodiments, the public key PK_B of the recipient and the private key SK_B of the recipient are asymmetric encryption keys.

Block 403 comprises: verifying the transaction based at least on the transaction commitment value T, the transaction blinding factor r_t, and the transaction amount t.

Alternative to encrypting the combination (r_t, t) such as (r_t||t) at node A, node A may transmit (r_t, t) to node B, causing node B to encrypt the combination (r_t, t), as described below with reference to FIG. 4A and FIG. 4B. Other steps and descriptions of FIG. 1 to FIG. 3B may similarly apply to FIG. 4A and FIG. 4B.

FIG. 4A illustrates a flowchart of an exemplary method 440 for information protection, according to various embodiments of the present disclosure. The method 440 may be implemented by one or more components (e.g., node A, node 1, a combination of node A and node 1) of the system 100 of FIG. 1. The method 440 may be implemented by a system or device (e.g., computer, server) comprising a processor and a non-transitory computer-readable storage medium (e.g., memory) storing instructions to be executed by the processor to cause the system or device (e.g., the processor) to perform the method 440. The operations of method 440 presented below are intended to be illustrative. Depending on the implementation, the exemplary method 440 may include additional, fewer, or alternative steps performed in various orders or in parallel.

Block 441 comprises: committing a transaction amount t of a transaction with a commitment scheme to obtain a transaction commitment value T, the commitment scheme comprising at least a transaction blinding factor r_t.

Block 442 comprises: sending the transaction amount t, the transaction blinding factor r_t, and the transaction commitment value T to a recipient node associated with a recipient of the transaction for the recipient node to verify the transaction and to encrypt the transaction blinding factor r_t and the transaction amount t with a public key PK_B of the recipient (e.g., causing the recipient node to verify the transaction and to encrypt the transaction blinding factor r_t and the transaction amount t with a public key PK_B of the recipient). For example, node B may verify if T=PC(r_t, t), and node B may encrypt the combination with the public key PK_B to obtain E(PK_B, r_t||t).

Block 443 comprises: obtaining an encrypted combination (e.g., E(PK_B, r_t||t)) of the transaction blinding factor r_t and the transaction amount t from the recipient node.

Block 444 comprises: transmitting the encrypted combination and the transaction commitment value T to a plurality of nodes in a blockchain for the plurality of nodes to verify the transaction (e.g., causing the plurality of nodes to verify the transaction).

FIG. 4B illustrates a flowchart of an exemplary method 450 for information protection, according to various embodiments of the present disclosure. The method 450 may be implemented by one or more components (e.g., node B, node 2, a combination of node B and node 2, etc.) of the system 100 of FIG. 1. The method 450 may be implemented by a system or device (e.g., computer, server) comprising a processor and a non-transitory computer-readable storage medium (e.g., memory) storing instructions to be executed by the processor to cause the system or device (e.g., the processor) to perform the method 450. The operations of the method 450 presented below are intended to be illustrative. Depending on the implementation, the exemplary method 450 may include additional, fewer, or alternative steps performed in various orders or in parallel.

Block 451 comprises: obtaining a transaction amount t of a transaction, a transaction blinding factor r_t, and a transaction commitment value T.

Block 452 comprises: verifying the transaction based on the obtained transaction amount t, the obtained transaction blinding factor r_t, and the obtained transaction commitment value T.

Block 453 comprises: in response to successfully verifying the transaction, encrypting the transaction blinding factor r_t and the transaction amount t with a public key PK_B of a recipient of the transaction to obtain an encrypted combination (e.g., E(PK_B, r_t||t)).

Block 454 comprises: transmitting the encrypted combination to a sender node associated with a sender of the transaction.

As shown, the privacy for the transaction amount can be protected through various improvements of the computing technology. For example, the account structure comprise one or more fields, such as a first field associated with the Pedersen commitment of the asset value (e.g., the first field being $PC(r\_\{a\_i\}, a\_i)$, with i being between 1 and m) and a second field associated with the random number for the Pedersen commitment and the asset value (e.g., the second field being E( . . . )). The first field and second field are also used in the transaction steps and stored in blockchain.

For another example, a public-private key system (asymmetric cryptography) of the account is reused for encrypting the random number of each Pedersen commitment and the corresponding asset value, and storing the transaction including the encrypted random numbers and asset values in the blockchain. This manner obviates local management of such random numbers and promotes security based on the distributed and consistent blockchain storage. Thus, the random number for the commitment can be effectively stored through blockchain, without requiring additional encryption system.

For yet another example, range proof is used to prove that the pre-existing assets of the transaction are balanced against the new assets and the transaction, and that the value of each new asset is in a reasonable range. Further, the transaction parties may transmit the committed random number and the value of the new asset to the recipient through a secured off-blockchain channel to verify whether the committed value matches the value of the transaction asset.

As such, random numbers of Pedersen commitments can be conveniently managed, without the risk for corruption and without incurring additional key management burden. Thus, the transaction privacy can be thoroughly protected, and transaction amounts can be kept as secrets.

The techniques described herein are implemented by one or more special-purpose computing devices. The special-purpose computing devices may be desktop computer systems, server computer systems, portable computer systems, handheld devices, networking devices or any other device or combination of devices that incorporate hard-wired and/or program logic to implement the techniques. Computing device(s) are generally controlled and coordinated by operating system software. Conventional operating systems control and schedule computer processes for execution, perform memory management, provide file system, networking, I/O services, and provide a user interface functionality, such as a graphical user interface ("GUI"), among other things.

Figure 5:
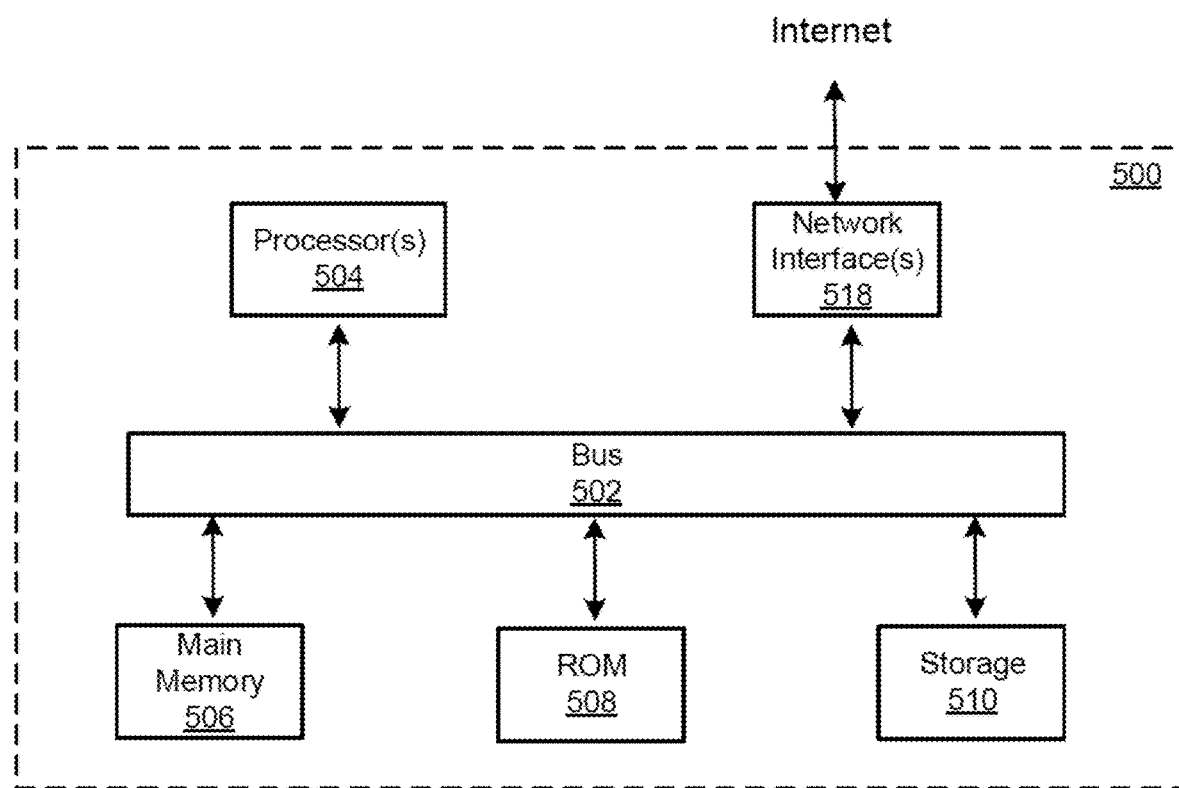
FIG. 5 illustrates a block diagram of an exemplary computer system in which any of the embodiments described herein may be implemented.

FIG. 5 is a block diagram that illustrates a computer system 500 upon which any of the embodiments described herein may be implemented. The system 500 may be implemented in any of the nodes described herein and configured to perform corresponding steps for information protection methods. The computer system 500 includes a bus 502 or other communication mechanism for communicating information, one or more hardware processor(s) 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor(s) 504. Main memory 506 also may be used for storing temporary variables or other intermediate information during execution of instructions to be executed by processor(s) 504. Such instructions, when stored in storage media accessible to processor(s) 504, render computer system 500 into a special-purpose machine that is customized to perform the operations specified in the instructions. The computer system 500 further includes a read only memory (ROM) 508 or other static storage device coupled to bus 502 for storing static information and instructions for processor(s) 504. A storage device 510, such as a magnetic disk, optical disk, or USB thumb drive (Flash drive), etc., is provided and coupled to bus 502 for storing information and instructions.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the operations, methods, and processes described herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The main memory 506, the ROM 508, and/or the storage device 510 may include non-transitory storage media. The term "non-transitory media," and similar terms, as used herein refers to media that store data and/or instructions that cause a machine to operate in a specific fashion, the media excludes transitory signals. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 500 also includes a network interface 518 coupled to bus 502. Network interface 518 provides a two-way data communication coupling to one or more network links that are connected to one or more local networks. For example, network interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicate with a WAN). Wireless links may also be implemented. In any such implementation, network interface 518 sends and receives electrical, electromagnetic or optical signals that carry digital data streams representing various types of information.

The computer system 500 can send messages and receive data, including program code, through the network(s), network link and network interface 518. In the Internet example, a server might transmit a requested code for an application program through the Internet, the ISP, the local network and the network interface 518.

The received code may be executed by processor(s) 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The exemplary blocks or states may be performed in serial, in parallel, or in some other manner. Blocks or states may be added to or removed from the disclosed exemplary embodiments. The exemplary systems and components described herein may be configured differently than described. For example, elements may be added to, removed from, or rearranged compared to the disclosed exemplary embodiments.

The various operations of exemplary methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function, but can learn from training data to make a predictions model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some exemplary embodiments, the processors or processor-implemented engines may be located in a single geographic location (e.g., within a home environment, an office environment, or a server farm). In other exemplary embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific exemplary embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed. The Detailed Description should not to be taken in a limiting sense, and the scope of various embodiments is defined only by the appended claims, along with the full range of equivalents to which such claims are entitled.

The invention claimed is:

1. A computer-implemented method, comprising:
obtaining, by one or more blockchain nodes, a transaction comprising (i) one or more inputs each corresponding to a commitment value of an asset of a sender of the transaction, and (ii) one or more outputs including a transaction commitment value T corresponding to a commitment value of a transaction amount t of the transaction;
verifying, by the one or more blockchain nodes, the transaction, wherein the verification comprises verifying whether one or more inputs of the transaction and one or more outputs of the transaction are balanced; and
in response to successfully verifying the transaction, adding, by the one or more blockchain nodes, the transaction to a blockchain.

2. The method of claim 1, wherein:
the transaction further comprises a digital signature SIGA corresponding to a signature of the transaction based on a private key SK_A of the sender of the transaction;
the verification further comprises verifying the digital signature SIGA based on a public key PK_A of the sender of the transaction;
the transaction further comprises a digital signature SIGB corresponding to a signature of the transaction based on a private key SK_B of a recipient of the transaction; and
the verification further comprises verifying the digital signature SIGB based on a public key PK_B of the recipient of the transaction.

3. The method of claim 1, wherein:
the verification further comprises verifying whether an asset type of the transaction amount t is consistent with an asset type of the one or more inputs.

4. The method of claim 1, wherein:
the transaction further comprises a range proof RP; and
the verification further comprises verifying whether the transaction amount t is no less than zero by verifying the range proof RP.

5. The method of claim 1, wherein:
the one or more outputs further include a change commitment value Y corresponding to a commitment value of a change y of the transaction.

6. The method of claim 5, wherein:
the transaction further comprises a range proof RP; and
the verification further comprises verifying whether the change y is no less than zero by verifying the range proof RP.

7. The method of claim 5, wherein:
the one or more inputs correspond to one or more commitment values of one or more assets committed based on one or more random numbers;
the transaction commitment value T corresponds to a commitment value of the transaction amount t committed based on a random number r_t;
the change commitment value Y corresponds to a commitment value of the change y committed based on a random number r_y; and
the transaction further comprises a value r' corresponding a difference between (i) a sum of the one or more random numbers and (ii) a sum of the random number r_t and the random number r_y.

8. The method of claim 7, wherein verifying whether the one or more inputs of the transaction and the one or more outputs of the transaction are balanced comprises:
verifying whether a product between the value r' and a parameter G is equal to a difference between (i) a sum of the one or more commitment values and (ii) a sum of the transaction commitment value T and the change commitment value Y.

9. The method of claim 1, wherein:
the transaction further comprises (i) an encrypted combination of a transaction blinding factor r_y and a change y with a public key PK_A of the sender of the transaction and (ii) an encrypted combination of a transaction blinding factor r_t and the transaction amount t with a public key PK_B of a recipient of the transaction.

10. The method of claim 1, wherein:
the transaction further comprises an identification of the transaction; and
the identification comprises a hash value.

11. The method of claim 1, wherein the verification further comprises verifying the blockchain using an anti-double-spending mechanism and an anti-replay-attack mechanism.

12. A non-transitory computer-readable storage medium storing instructions that, when executed by a processor, cause the processor to perform operations comprising:

obtaining a transaction comprising (i) one or more inputs each corresponding to a commitment value of an asset of a sender of the transaction, and (ii) one or more outputs including a transaction commitment value T corresponding to a commitment value of a transaction amount t of the transaction;

verifying the transaction, wherein the verification comprises verifying whether one or more inputs of the transaction and one or more outputs of the transaction are balanced; and in response to successfully verifying the transaction, adding the transaction to a blockchain.

13. The non-transitory computer-readable storage medium of claim 12, wherein:

the verification further comprises verifying whether an asset type of the transaction amount t is consistent with an asset type of the one or more inputs.

14. The non-transitory computer-readable storage medium of claim 12, wherein:

the transaction further comprises a range proof RP; and the verification further comprises verifying whether the transaction amount t is no less than zero by verifying the range proof RP.

15. The non-transitory computer-readable storage medium of claim 12, wherein:

the one or more outputs further include a change commitment value Y corresponding to a commitment value of a change y of the transaction.

16. The non-transitory computer-readable storage medium of claim 15, wherein:

the transaction further comprises a range proof RP; and the verification further comprises verifying whether the change y is no less than zero by verifying the range proof RP.

17. The non-transitory computer-readable storage medium of claim 15, wherein:

the one or more inputs correspond to one or more commitment values of one or more assets committed based on one or more random numbers;

the transaction commitment value T corresponds to a commitment value of the transaction amount t committed based on a random number $r\_t$;

the change commitment value Y corresponds to a commitment value of the change y committed based on a random number $r\_y$; and the transaction further comprises a value r' corresponding a difference between (i) a sum of the one or more random numbers and (ii) a sum of the random number $r\_t$ and the random number $r\_y$.

18. The non-transitory computer-readable storage medium of claim 17, wherein verifying whether the one or more inputs of the transaction and the one or more outputs of the transaction are balanced comprises:

verifying whether a product between the value r' and a parameter G is equal to a difference between (i) a sum of the one or more commitment values and (ii) a sum of the transaction commitment value T and the change commitment value Y.

19. The non-transitory computer-readable storage medium of claim 12, wherein:

the transaction further comprises (i) an encrypted combination of a transaction blinding factor $r\_y$ and a change y with a public key PK_A of the sender of the transaction and (ii) an encrypted combination of a transaction blinding factor $r\_t$ and the transaction amount t with a public key PK_B of a recipient of the transaction.

20. A system comprising one or more processors and one or more memories storing instructions that, when executed by the one or more processors, cause the system to perform operations comprising:

obtaining a transaction comprising (i) one or more inputs each corresponding to a commitment value of an asset of a sender of the transaction, and (ii) one or more outputs including a transaction commitment value T corresponding to a commitment value of a transaction amount t of the transaction;

verifying the transaction, wherein the verification comprises verifying whether one or more inputs of the transaction and one or more outputs of the transaction are balanced; and in response to successfully verifying the transaction, adding the transaction to a blockchain.

* * * * *